US010625761B2

(12) United States Patent
Brooks

(10) Patent No.: US 10,625,761 B2
(45) Date of Patent: Apr. 21, 2020

(54) MANUALLY OPERABLE CARRIAGE AND WORKING ATTACHMENTS THAT MAY BE EMPLOYED WITH THE CARRIAGE

(71) Applicant: Stephen David Brooks, Hubbardsville, NY (US)

(72) Inventor: Stephen David Brooks, Hubbardsville, NY (US)

( * ) Notice: Subject to any disclaimer, the term of this patent is extended or adjusted under 35 U.S.C. 154(b) by 0 days.

(21) Appl. No.: 16/171,527

(22) Filed: Oct. 26, 2018

(65) Prior Publication Data

US 2019/0126962 A1 May 2, 2019

Related U.S. Application Data

(60) Provisional application No. 62/580,183, filed on Nov. 1, 2017.

(51) Int. Cl.
*B62B 1/14* (2006.01)
*B62B 5/06* (2006.01)
*B62B 1/12* (2006.01)
*B62B 5/00* (2006.01)
*E01H 5/02* (2006.01)

(52) U.S. Cl.
CPC ............ *B62B 1/12* (2013.01); *B62B 1/14* (2013.01); *B62B 5/0079* (2013.01); *B62B 5/064* (2013.01); *B62B 5/0083* (2013.01); *B62B 2203/02* (2013.01); *E01H 5/02* (2013.01)

(58) Field of Classification Search
CPC ........... B62B 1/12; B62B 1/14; B62B 5/0079; B62B 5/064; B62B 5/0083; B62B 2203/02; E01H 5/02
USPC ...................................................... 280/47.18
See application file for complete search history.

(56) References Cited

U.S. PATENT DOCUMENTS

| | | | |
|---|---|---|---|
| 4,910,893 A | 3/1990 | Asay | |
| 6,457,757 B2 * | 10/2002 | Hendrick | E01H 5/02 294/53.5 |
| 8,166,677 B1 * | 5/2012 | Woyak | E01H 5/02 294/54.5 |
| 8,955,238 B1 * | 2/2015 | Castruccio | E01H 5/065 37/231 |
| 2005/0160632 A1 * | 7/2005 | Williams | B62B 1/147 37/265 |

OTHER PUBLICATIONS

Vidaxl, Hand Snow Shovel Thrower Plow Removal Pusher, Oct. 18, 2017, 12 pages.

* cited by examiner

*Primary Examiner* — John D Walters

(57) ABSTRACT

The present invention relates to a manually operable carriage and working attachments that may be employed with the carriage. The attachments may include a plow, a logging clamp, or other implements.

11 Claims, 29 Drawing Sheets

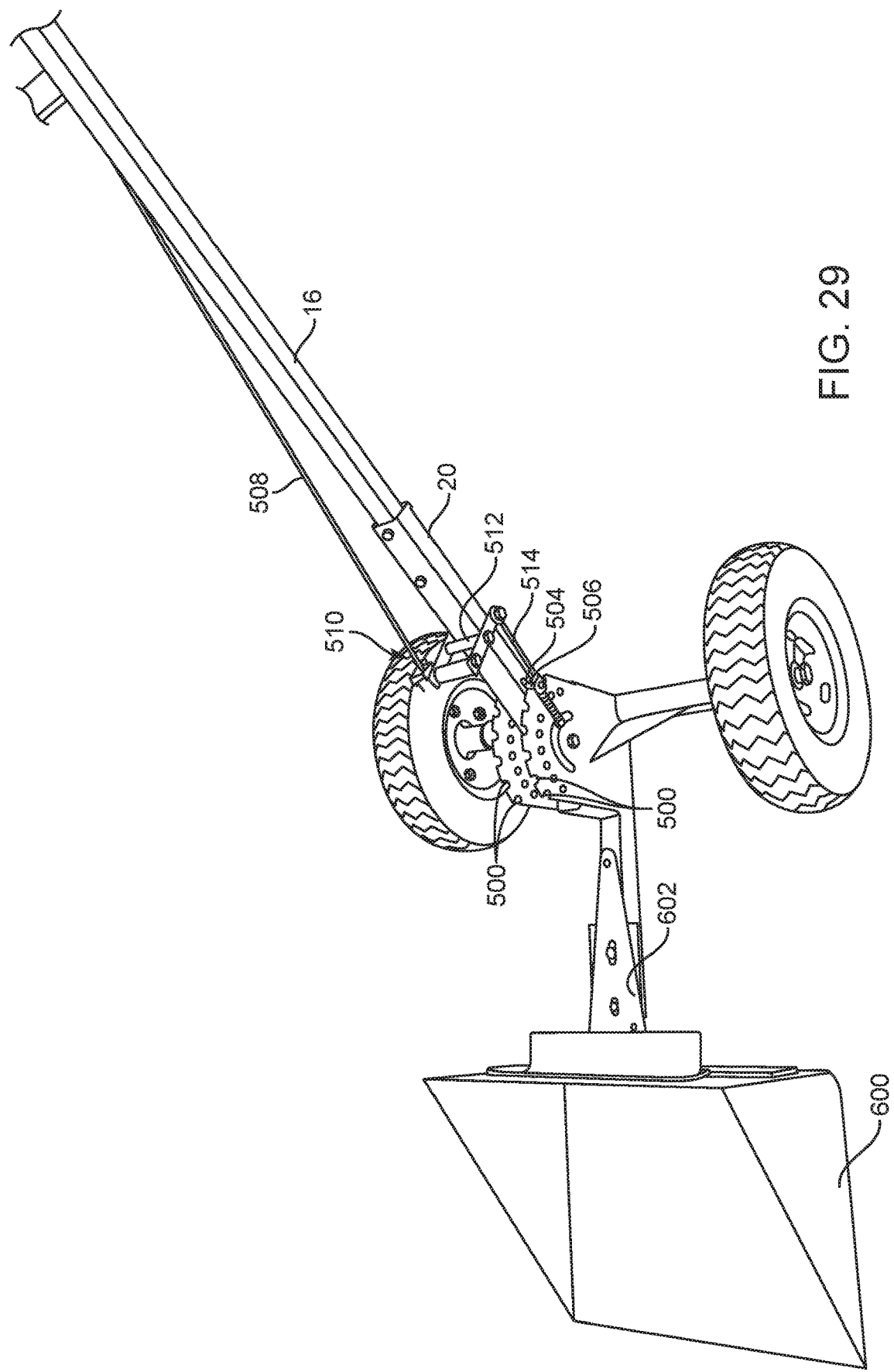

MANUALLY OPERABLE CARRIAGE AND WORKING ATTACHMENTS THAT MAY BE EMPLOYED WITH THE CARRIAGE

CROSS-REFERENCE TO RELATED APPLICATIONS

The present application claims priority to, and the benefit of, U.S. Provisional Patent Application Ser. No. 62/580,183, filed Nov. 1, 2017 entitled "MANUALLY OPERABLE CARRIAGE AND WORKING ATTACHMENTS THAT MAY BE EMPLOYED WITH THE CARRIAGE", which is hereby incorporated by reference in its entirety.

FIELD OF THE INVENTION

The present invention relates to a manually operable carriage for use with working implements such as a plow, a logging clamp, or other implements.

BACKGROUND OF THE INVENTION

Many tasks are performed manually using a variety of implements such as brooms, snow shovels, or other working implements. Normally such implements involve a long handle by which a person may maneuver the implement. The handle is usually in a fixed position relative to the working portion of the broom, shovel, etc. whereby the person is forced to bend, twist, turn, or otherwise arrange his or her body in order to shove, push, lift, lower, or haul the implement effectively and efficiently during use. Moreover, many such implements are manufactured with "one-size-fits-all" common dimensions that do not take into account the user's height, weight, strength, or agility, thereby further exacerbating these physical demands.

The foregoing types of implements can either (1) limit the ability of a person to use the implement effectively and efficiently, (2) cause severe physical discomfort, pain, or harm, or (3) both.

Accordingly, there is a need for a device that permits ease and efficiency of using one or more different working implements, preferably interchangeable implements, for persons of many body types.

SUMMARY OF THE INVENTION

The present invention relates to a manually operable carriage and working attachments that may be employed with the carriage. The attachments may include a plow, a logging clamp, or other implements.

BRIEF DESCRIPTION OF THE DRAWINGS

The invention will be described with reference to the accompanying drawings, wherein:

FIG. 29 is a partial perspective view of the carriage shown in FIGS. 27 and 28 with a scoop attachment.

DESCRIPTION OF A PREFERRED EMBODIMENT

Figure 1:
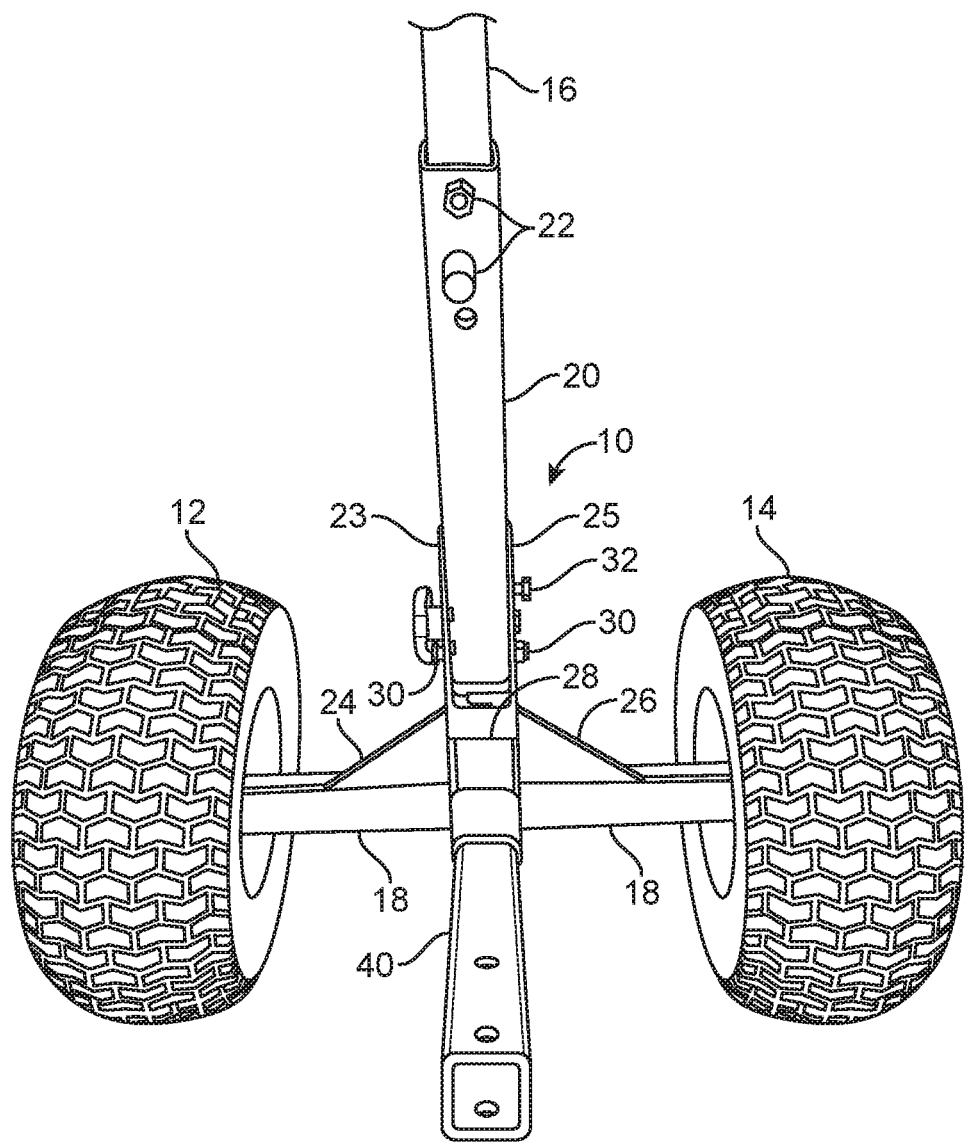
FIG. 1 is a partial front plan view of a carriage in accordance with one embodiment of the present invention.

The present invention will be described with reference to the accompanying drawings wherein like reference numerals refer to the same item. It should be appreciated that the following description is intended to be exemplary only, and the scope of the invention envisions other variations and modifications of these particular exemplary embodiments.

The invention relates to a manually operable carriage and will be described with reference to the attached photos using reference numbers. The carriage includes generally a frame 10, a set of wheels 12, 14, and a handle 16.

The frame 10 is preferably fashioned of metal such as steel and includes a bar 18 horizontally extending between two wheels 12, 14, with each wheel 12, 14 rotatably mounted on an associated longitudinal end of the bar 18. The frame 10 includes a first receiver 40 secured to and extending forward from the bar 18, and preferably welded at one end thereof to a side surface of the bar midway between the longitudinal ends of the bar 18. The first receiver 40 is preferably tubular with a square cross-section, but may possess a circular or other cross-section, and is preferably in the range of about one to two feet in length. The outward end of the first receiver 40 possesses at least one pair, and very preferably two pairs, of opposing holes therein, though which a bolt or pin may selectively extend.

The frame 10 also includes a bracket formed of two spaced, parallel, rectangular plates 23, 25 of preferably substantially identical construction. The plates 23, 25 are maintained in a spaced, parallel relationship by means of a spacer 28 extending between the plates 23, 25 along a portion of the lateral edges thereof and welded to the plates 23, 25. Also, corresponding ends of the plates 23, 25 are welded to the end of the first receiver 40, in the region near the bar. The plates 23, 25 generally extend outwardly in a direction perpendicular to the extent of the bar 18 and perpendicular to the first receiver 20. The plates 24, 26 may be further maintained in such a spaced, parallel relationship by means of a pair of preferably triangularly spaced braces 24, 26. Each brace 24, 26 extends from the bar 18 to the outer surface of an associated one of the plates 23, 25, and is welded in a fixed position to the bar 18 and to the outer surface of the associated plate 23, 25.

Figure 2:
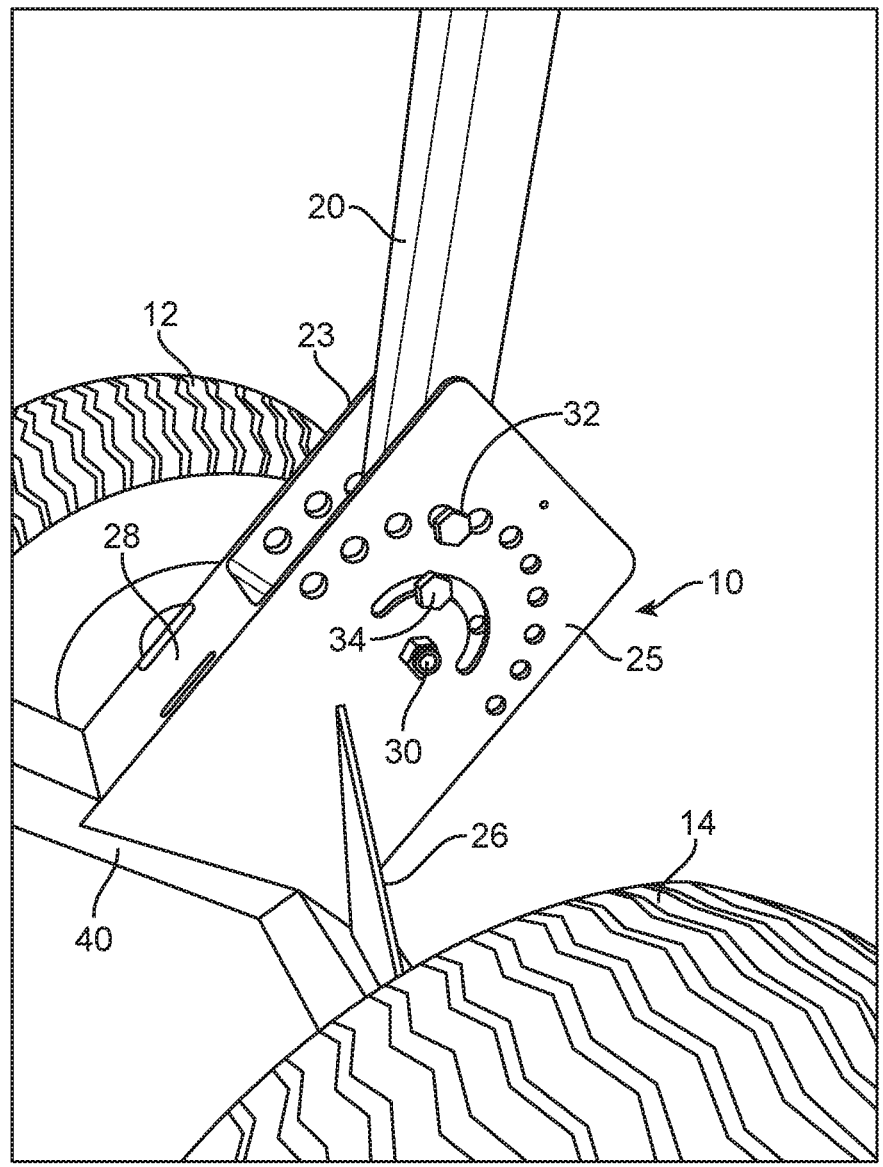
FIG. 2 is a partial perspective view of the carriage shown in FIG. 1.
Figure 3:
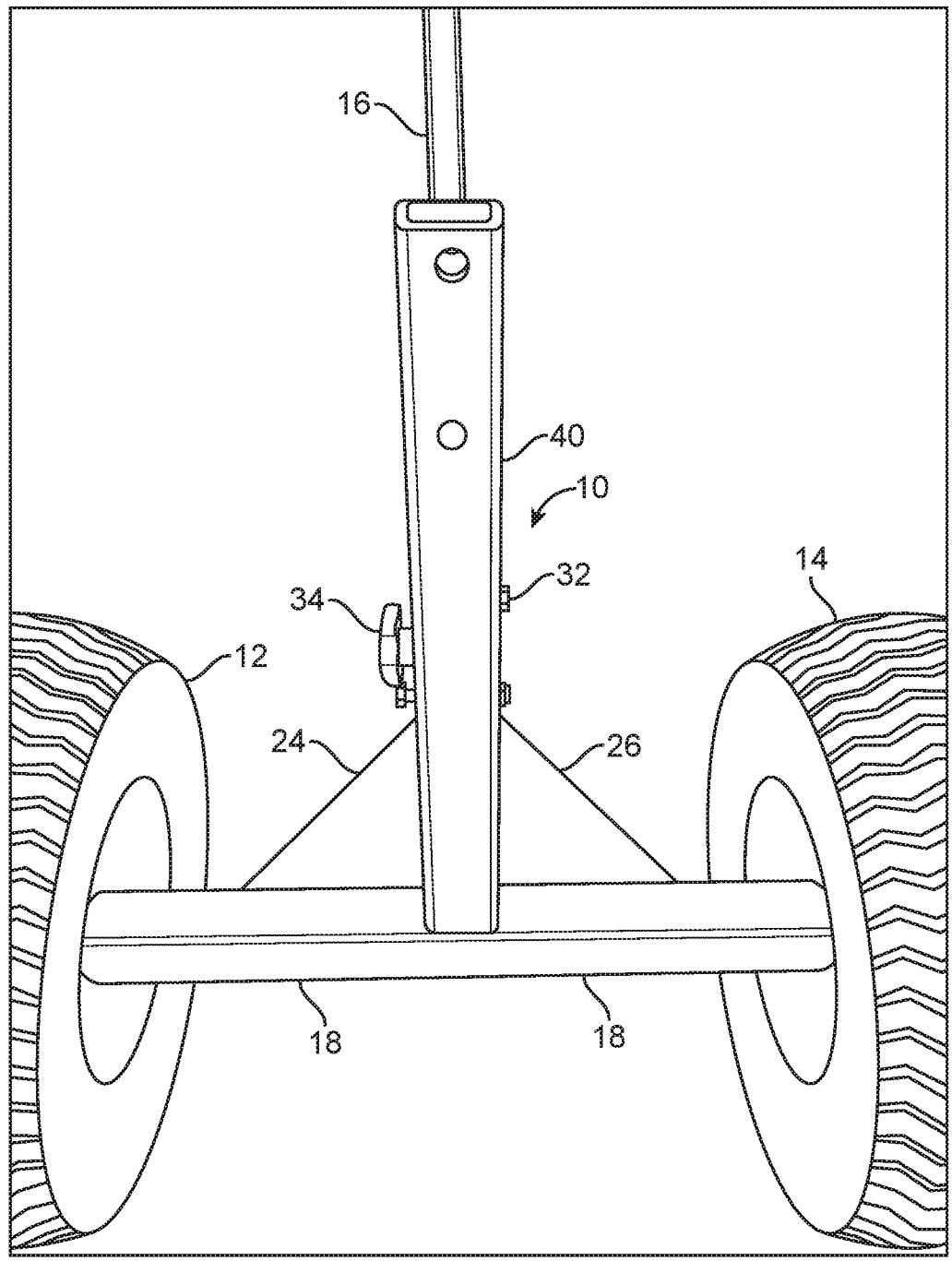
FIG. 3 is a partial bottom plan view of the carriage shown in FIGS. 1 and 2.
Figure 4:
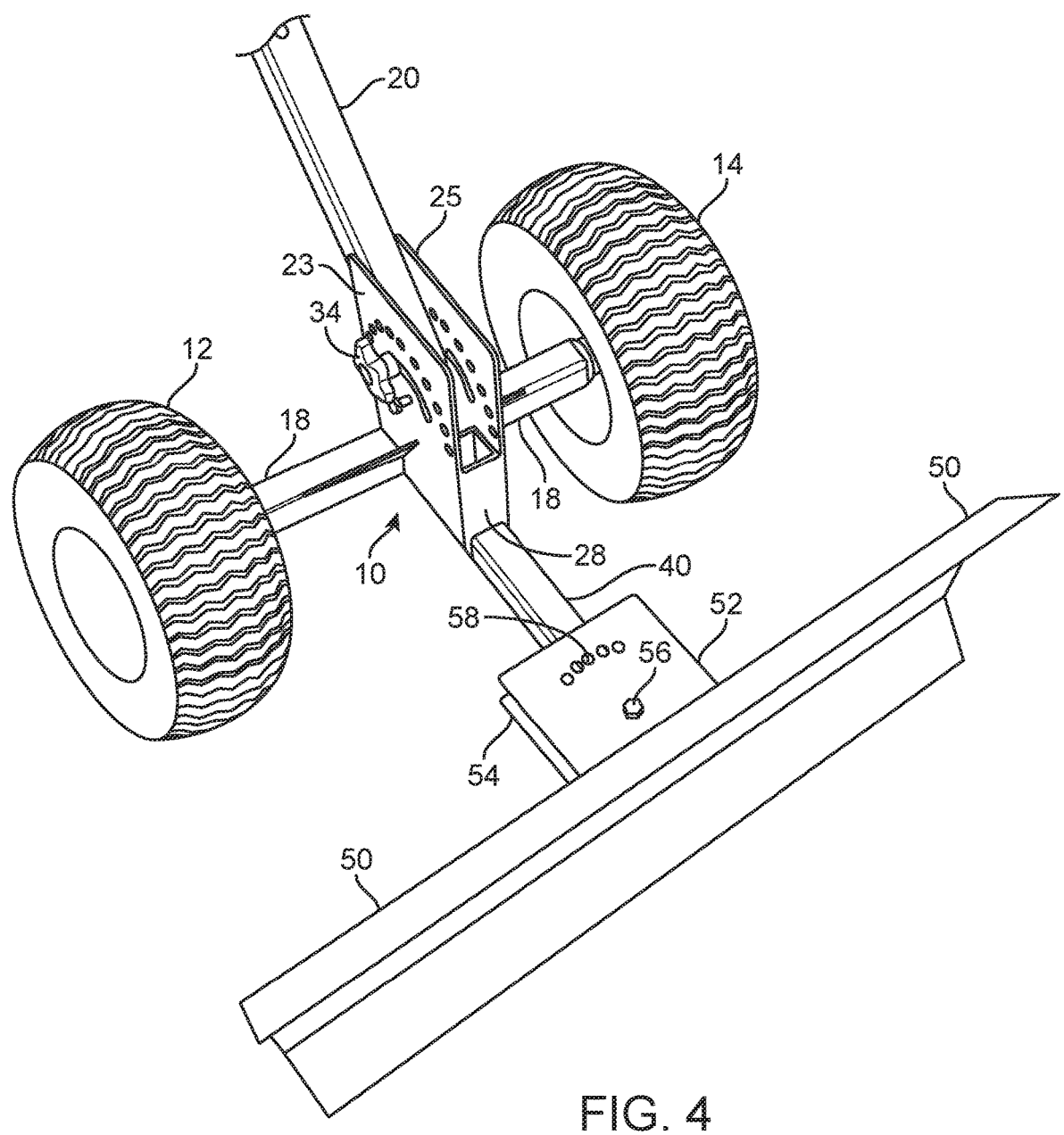
FIG. 4 is a partial perspective view of the carriage shown in FIGS. 1-3 with a plow attachment.

As best shown in FIGS. 2 and 4, each plate 23, 25 possesses a central hole therethrough, with the central hole in each plate 23, 25 diametrically opposite to the central hole in the other plate 23, 25. A bolt or pin 30 may selectively extend through the central holes in each plate 23, 25 to provide a pivot axle about which a second receiver 20 may rotate. Each plate 23, 25 also possesses a series of radial holes therethrough arcuately arranged around the central hole such that a radial hole in one plate is diametrically opposite to an associated one of the radial holes in the other plate 23, 25 such that a bolt or a pin 32 may selectively extend through two associated radial holes. Each plate 23, 25 also possesses a slot therein arcuately arranged around the central hole and concentric with the radial holes arranged therein. As shown in the attached photos, the slot is concentrically inward of the radial holes, but the invention contemplates that the opposite concentricity may be employed. The slot in each plate 23, 25 is diametrically opposite to the slot in the other plate 23, 25 to that a bolt or a pin 34 may selectively extend through both slots and ride within and translate along the lengths of the slots.

The second receiver 20 is mounted to and between the two plates 23, 25. Preferably the second receiver 20 is tubular with a square cross-section, but may possess a circular or other cross-section, and is preferably in the range of about one to two feet in length. A first end of the second receiver 20 preferably possesses at least three pairs of opposing holes therethrough though which an associated bolt or pin 30, 32, 34 may selectively extend. The position and spacing of the holes is such that one pair of holes in the second receiver 20 aligns with the central hole in each plate 23, 25, another pair of holes in the second receiver 20 aligns with the slot in each plate 23, 25, and the third pair of holes in the second receiver 20 aligns with the radial holes in each plate 23, 25. A second end of the second receiver 20 is adapted to selectively telescopically receive the handle 16.

The handle 16 is preferably "T"-shaped with the lower extent of the handle 16 possessing a cross-section so as to conformingly slide within the hollow center of the second receiver 20. The second end of the second receiver 20 possesses at least one pair, and preferably two pairs, of aligned holes therethrough. Likewise, the lower extent of the handle 16 possesses at least one pair, and preferably two pairs, of aligned holes spaced such that the holes in the second end of the second receiver 20 may selectively align with the holes in the lower extent of the handle 16 such that a bolt or pin 22 may extend through all of the aligned holes to selectively secure the handle 16 to the second receiver 20.

Figure 5:
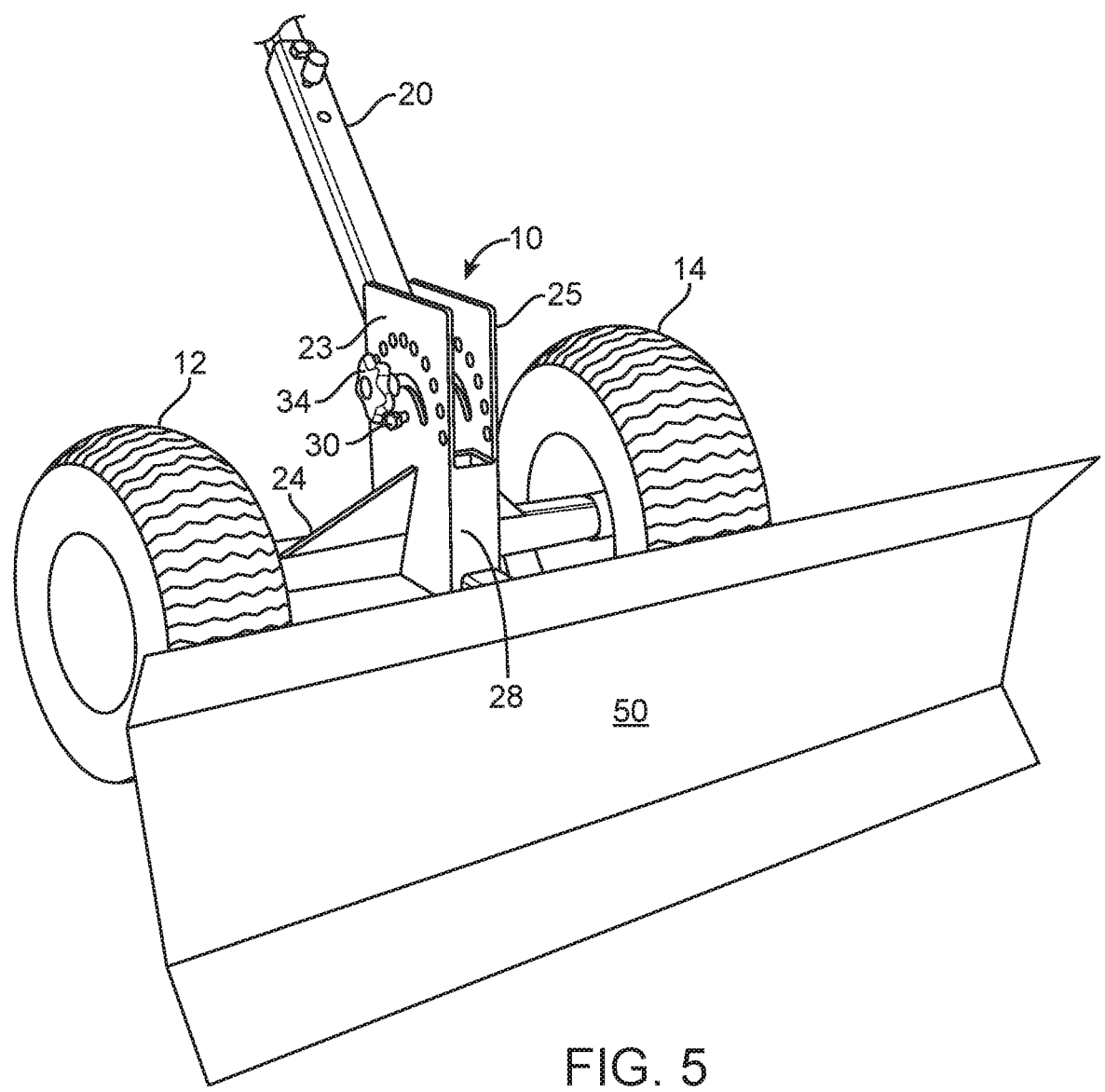
FIG. 5 is a another partial perspective view of the carriage and plow attachment shown in FIG. 4.

The carriage is adapted to be employed with various different working devices adapted to be selectively attached to the second end of the first receiver 40, opposite to the end preferably welded to the frame. One type of device is a snow and ice plow, as shown in FIGS. 4 and 5. The plow includes a generally laterally extending blade 50 and a pair of substantially identical, rectangular plow plates 52, 54 extending horizontally and rearwardly, centrally from the back surface of the blade 50. The plates 52, 54 are spaced and parallel. Each plate 52, 54 possesses a central plate hole near the blade 50 and a series of holes arranged arcuately around the central hole. The second end of the first receiver 40 includes at least two pairs of holes therethrough and spaced a distance apart equal to the distance from the central hole to the arcuate holes in the plow plates 52, 54. A bolt or pin 56 may selectively extend through one pair of holes in the second end of the first receiver 40 and through the central hole to provide a pivot point about which the blade 50 may pivot and be selectively angled relative to the frame 10. Another bolt or pin 58 may selectively extend through the other pair of holes in the second end of the first receiver 40 and through associated, aligned ones of the arcuate holes in the two plow plates 52, 54. By deciding which of the associated arcuately arranged holes through which the bolt or pin may extend, the angle of the blade 50 relative to the frame 10 may be selectively adjusted and maintained.

Figure 6:
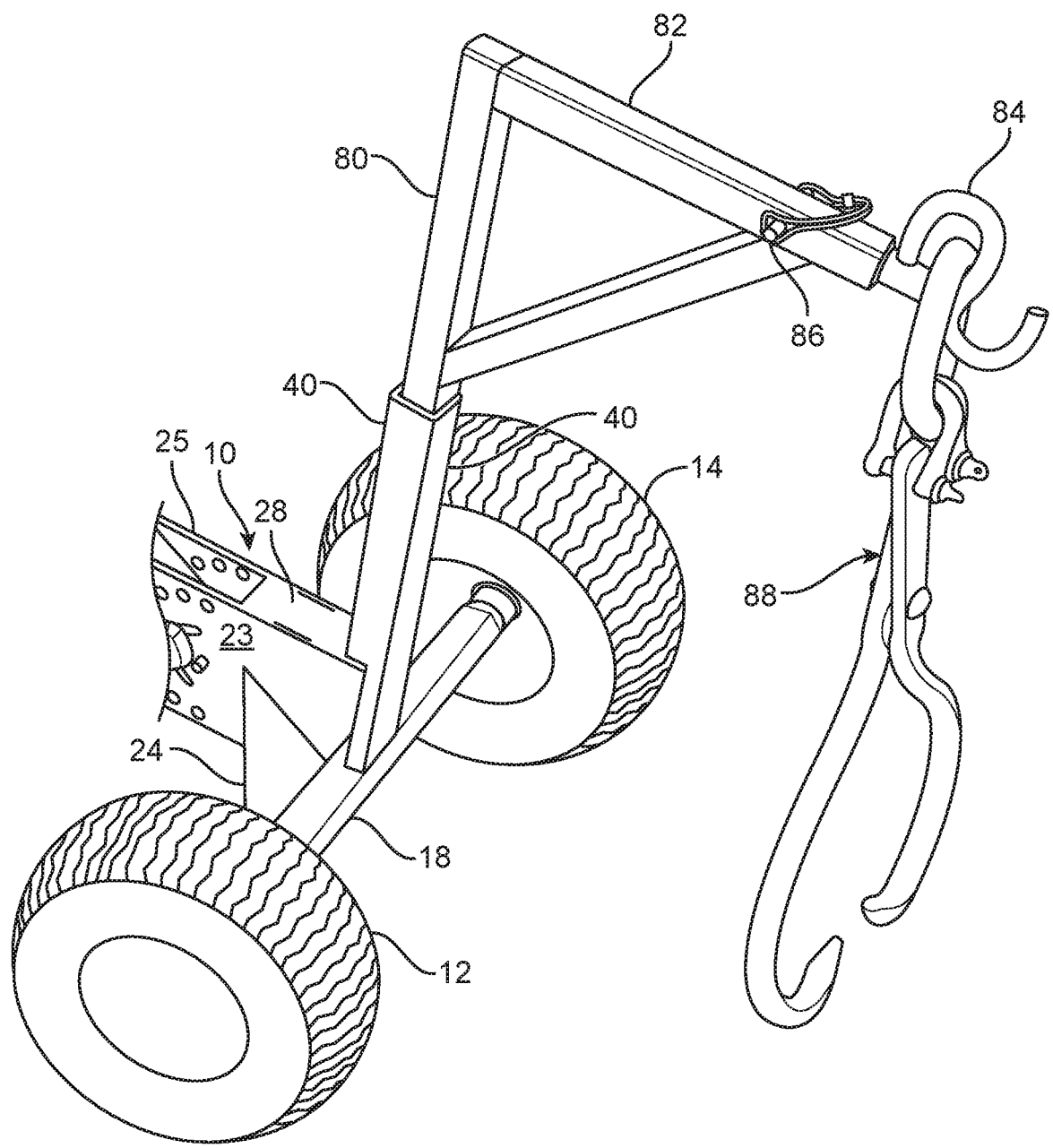
FIG. 6 is a partial perspective view of the carriage shown in FIGS. 1-3 with a logging clamp attachment.
Figure 7:
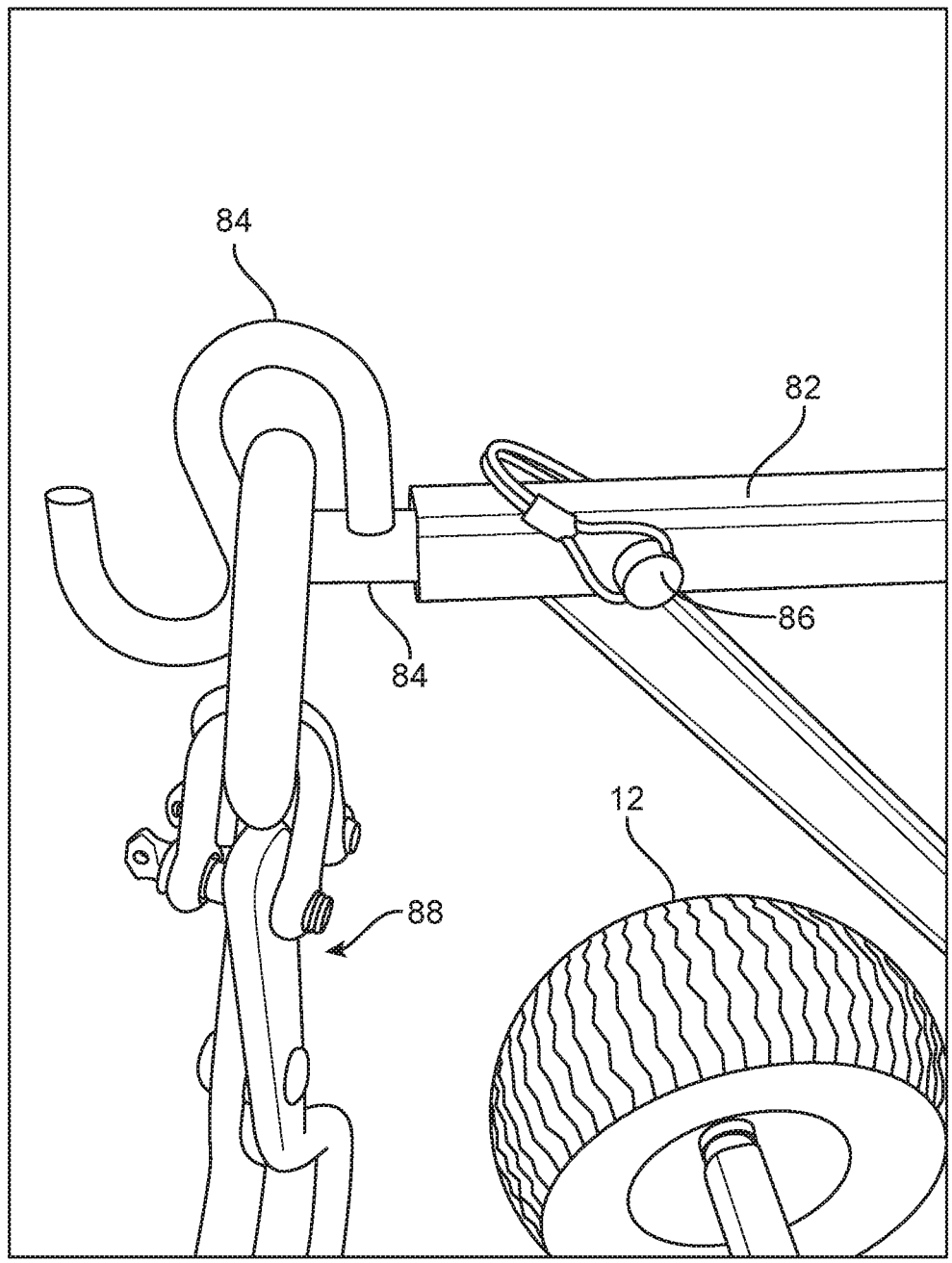
FIG. 7 is a partial perspective view of the carriage and logging clamp attachment shown in FIG. 6.

Another type of device that may be employed with the carriage is a log hauler, as shown in FIGS. 6 and 7. The hauler includes a bar 80 adapted to telescoping slide into the hollow interior of the second end of the first receiver 40. A first end of the bar 80 may ride loosely within, or may be selectively secured to, the second end of the first receiver 40 by means of a détente or set screw, or by bolts and pins extending through aligned holes in the bar 80 and the second end of the first receiver 40. The bar 80 is preferably in the range of one to two feet in length. An extender 82 may be affixed to the second end of the bar 80, away from the first end of the second receiver 40, such as by welding, preferably at a perpendicular orientation. The extender 82 is preferably in the range of one to two feet in length and is tubular, preferably possessing a rectangular cross-section, or a circular or other cross-section. The distal end of the extender 82 possesses a pair of aligned holes extending therethrough. An eye or hook 84 having one end relatively straight may be selectively inserted into the hollow interior of the end of the extender away from the bar 80. The relatively straight section includes at least one hole therethrough that may be aligned with the holes extending through the end of the extender 82 such that a bolt or pin 86 may extend through all of the aligned holes to selectively secure the eye or hook 84 to the extender 82. A conventional pair of logging clamps or tongs 88 may be mounted on the eye or hook for grasping a log in a well-known manner.

It will be appreciated that by choosing to extend a bolt or pin through a selected pair of aligned holes in the plates 23, 25, and also through the aligned holes in the handle 16, the angle of the handle 16 relative to the frame 10 may be altered and maintained. As such, height of the upper part of the handle 16 may be elevated or lowered so as to accommodate heights of different people who manually maneuver and operate the carriage. Additionally, such selective angling of the handle 16 relative to the plates 23, 25 will concurrently change the angle of the handle 16 relative to the first receiver 40 so that the angle of the first receiver relative to the ground or other supporting surface may also be altered and maintained for better manipulation of different working devices.

Figure 8:
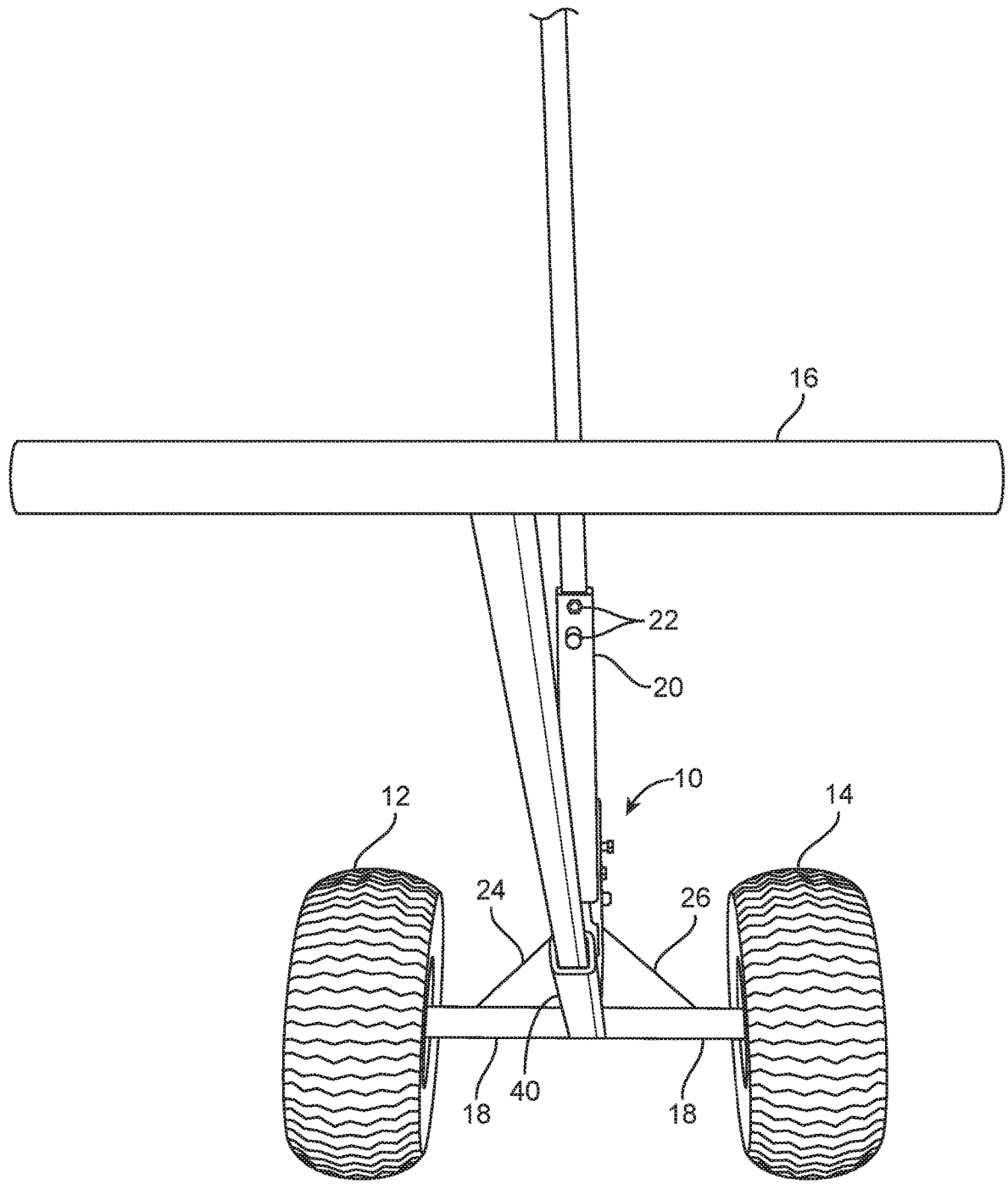
FIG. 8 is a partial front plan view of the carriage shown in FIGS. 1-3 displaying the feature of the interchangeability of a handle therefor.

The invention contemplates that the spacing between the pairs of holes in the outward end of the first receiver 40 may be the same as the spacing between the pairs of holes in the second end of the second receiver 20 so that the aforementioned functions of the receivers 40, 20 may be reversed, that is, the outward end of the first receiver 40 may receive the handle 16, and the second end of the second receiver 20 may receive the working device. In this reverse mode of operation, the angle of the working device relative to the frame 10, instead of the angle of the handle 16 to the frame 10 may be altered and maintained. FIG. 8 shows how the handle 16 may be inserted into the first receiver 40.

The invention also contemplates that instead of one of the receivers, 20,40 being in a fixed, or non-rotatable position relative to the frame 10 and the other receiver 20,40 being rotatable relative to the frame 10, both receivers 20,40 may be rotatable such that both receivers extend between an associated, opposing pair of plates and are each rotatable about an associated center pin selectively extending through aligned center holes in the associated pair of plates, with the plates each possessing aligned arcuate slots and radial holes for selectively receiving associated bolts or pins. In such a construction, the receivers 20, 40 may selectively extend at a wide range of angles, up to an angle of about 180 degrees, with respect to each other.

Figure 9:
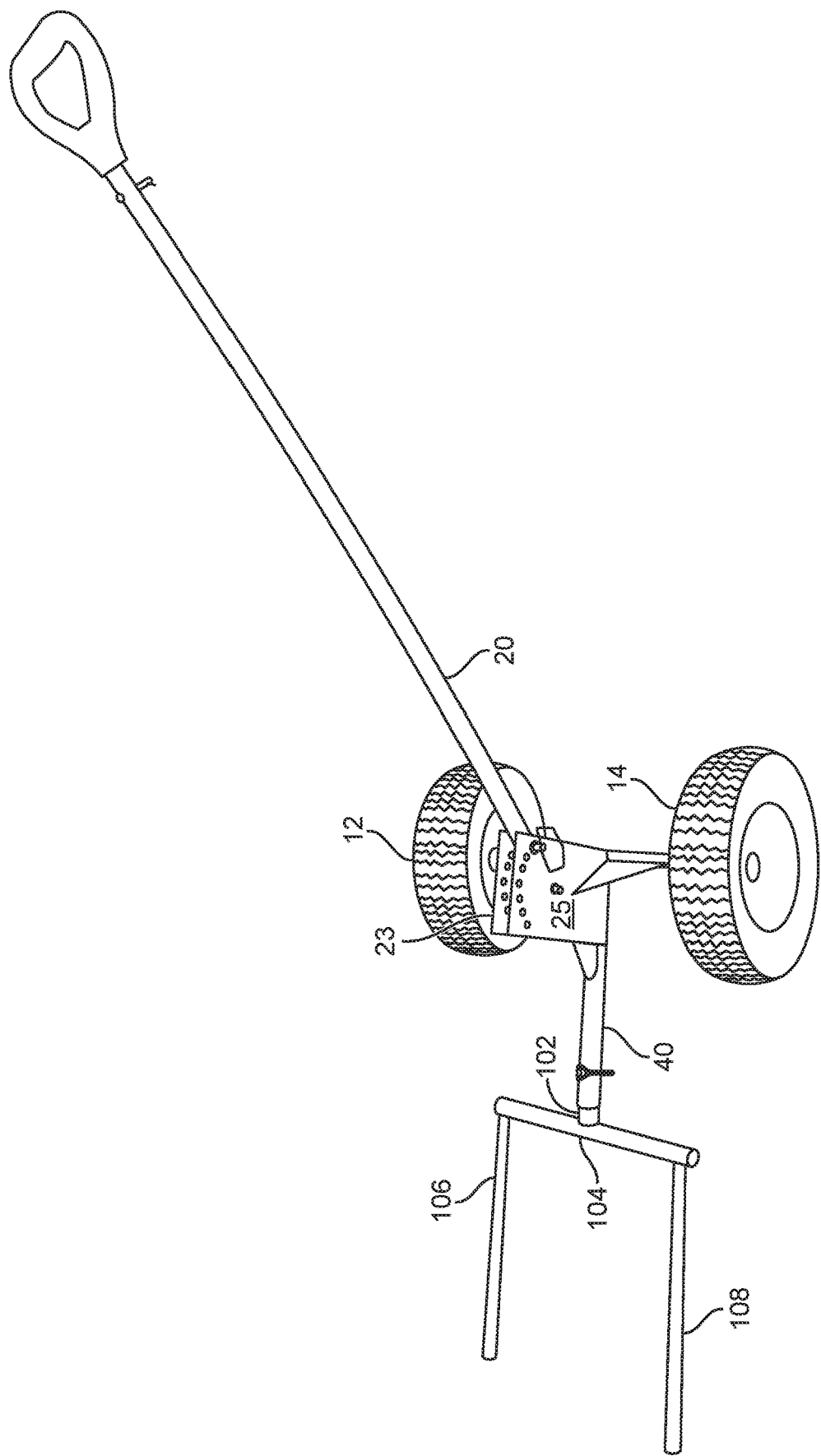
FIG. 9 is a perspective view of the carriage shown in FIGS. 1-3 with a fork attachment for moving items such as hay bales
Figure 10:
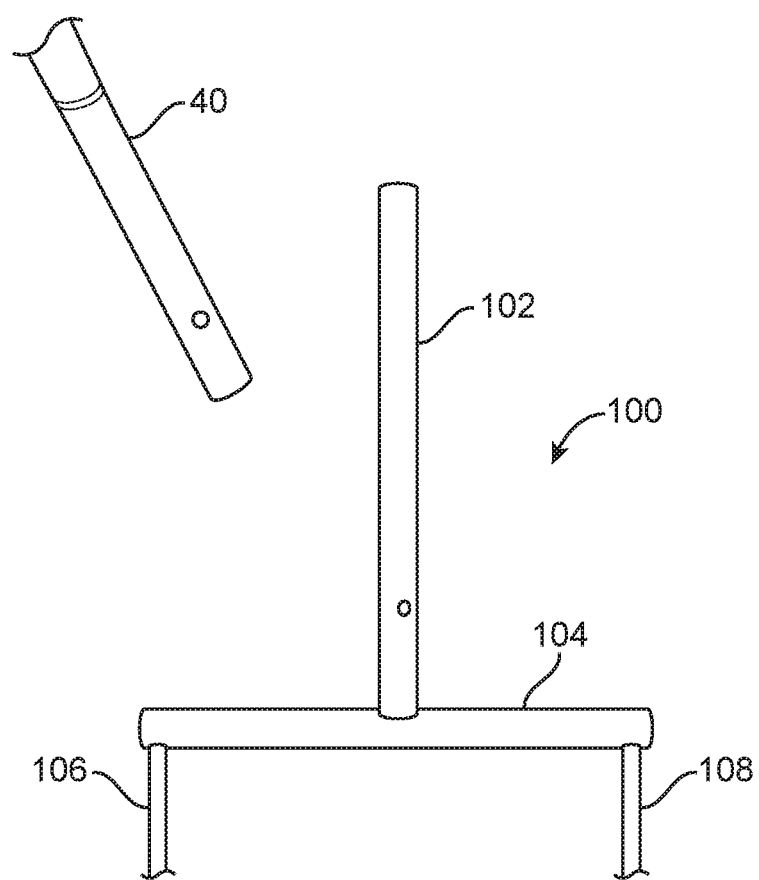
FIG. 10 is an exploded, plan view of the fork attachment shown in FIG. 9.
Figure 11:
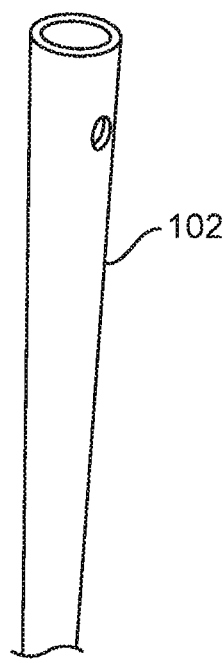
FIG. 11 is a perspective view of a portion of the fork attachment shown in FIGS. 9 and 10.

FIGS. 9-11 show yet another attachment for use with the carriage of the invention. The attachment includes a fork 100 including a central shaft 102 to the end of which is centrally connected such as by welding a cross shaft 104. At least one and preferably two or more tines 106, 108 protrude from the cross shaft 104, preferably from the distal ends thereof and pointed in the same general direction. The central shaft 102 is provided with at least one pair and preferably a plurality of pairs of holes aligned therethrough, preferably at different longitudinal and lateral positions. The central shaft 102 is adapted to selectively extend into the receiver 40 and to be selectively secured to the receiver 40 by means of a bolt or pin. By providing a plurality of aligned holed through the central shaft 102 as previously described, the tines 106,108 may extend at selected distances from the carriage frame 10 and also may be positioned so that the tines 106,108 may be held at a variety of positions ranging from the horizontal to the vertical. The carriage as shown in FIGS. 9-11 may be sued to push the tines 106,108 into a bale of hay, for example, and by pushing down the handle of the carriage, the hay bale concurrently lifts and may be moved about a barn, field, or other premise. After the hay bale is transported, the hay bale may be deposited at a desired location by raising the handle (really allowing the handle to raise), which lowers the hay bale to a surface below, and then pulling on the handle whereby the carriage is moved away from the bale and the tines 106,108 retract and disengage from the hay bale.

FIGS. 12-15 show another attachment for use with the carriage of the present invention, which is especially adapted for transporting snowmobiles. The attachment includes a hoist 120 including a vertical tube 122 and including a cross shaft 124. The cross shaft 124 possesses an "L"-shaped protrusion, the outer, or lower, end of which is adapted to be slidingly, rotatably received within the vertical tube 122. At least one and preferably two or more hooks 126,128 are connected to the cross shaft, preferably from the distal ends thereof and preferably depending therefrom. Although the hooks 126,128 may be welded or otherwise fixed to the cross shaft 124, in another embodiment one end of each hook 126,128 is looped such that the cross shaft 124 extends through each loop and selectively secures each hook 126, 128 about the cross shaft 124. Each hook 126,128 may be selectively secured to an associated distal end of the cross shaft 124 by an associated end cap 130,132. The end caps 130,132 may be selectively secured to the cross shaft 124 by means of a bolt that threadably extends into the associated distal end of the cross shaft 124. The end caps 130,132 may permit the associated hooks 126, 128 to swivel about the cross shaft 124, or the end caps 130,132 may compress the hooks 126, 128 so as to maintain the hooks 126,128 in selected positions about the cross shaft 124.

Figure 13:
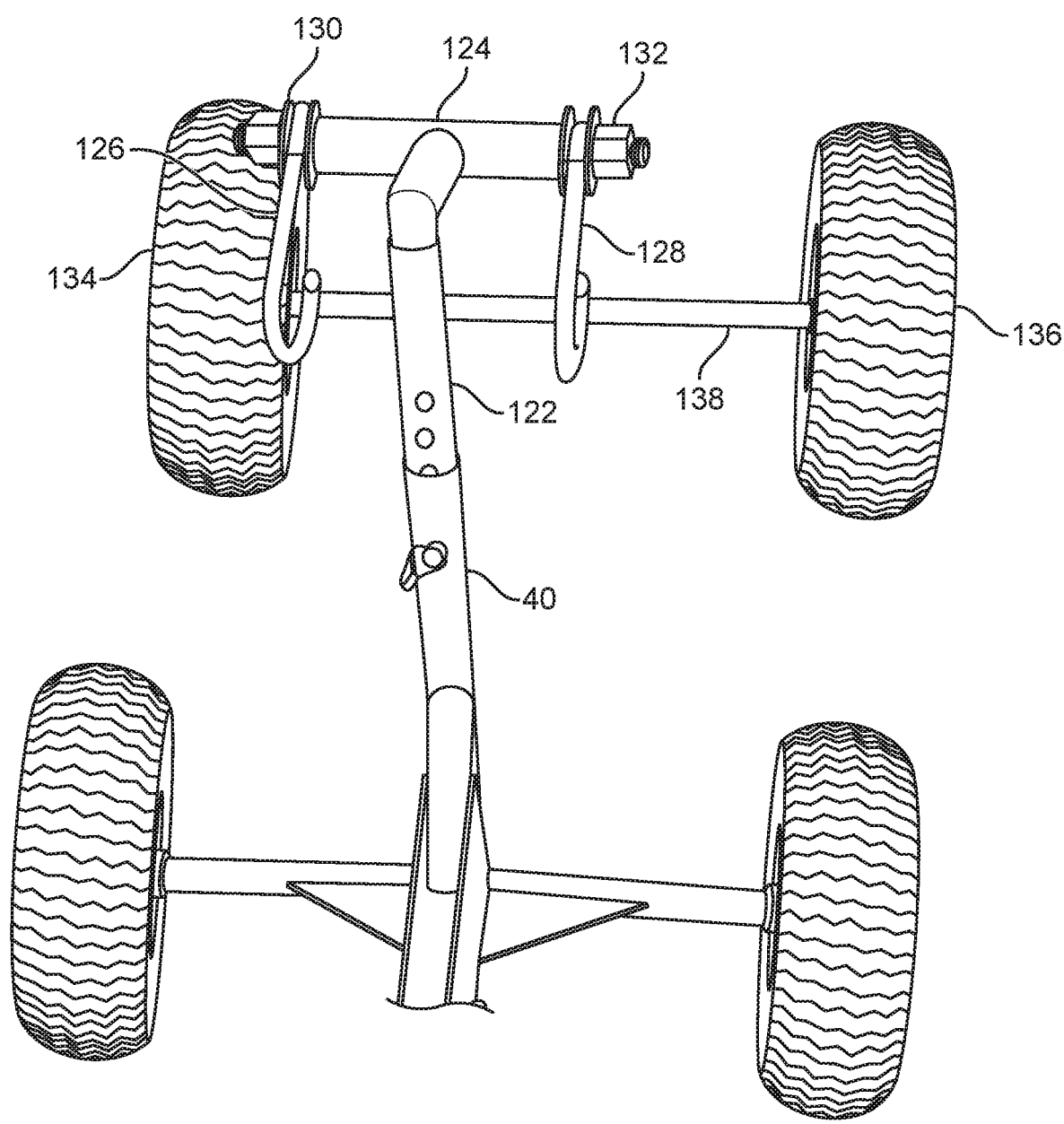
FIG. 13 is a partial top plan view of the carriage and hook attachment shown in FIG. 12.

As best shown in FIG. 13, the vertical tube 122 is provided with at least one pair, and preferably a plurality, of holes aligned therethrough, preferably at different longitudinal and lateral positions. The vertical tube 122 is adapted to selectively extend into the receiver 40 and to be selectively secured to the receiver 40 by means of a bolt or pin. By providing a plurality of such holes in the vertical tube 122, the cross shaft 124 may be raised or lowered and also rotated to a variety of positions.

Figure 14:
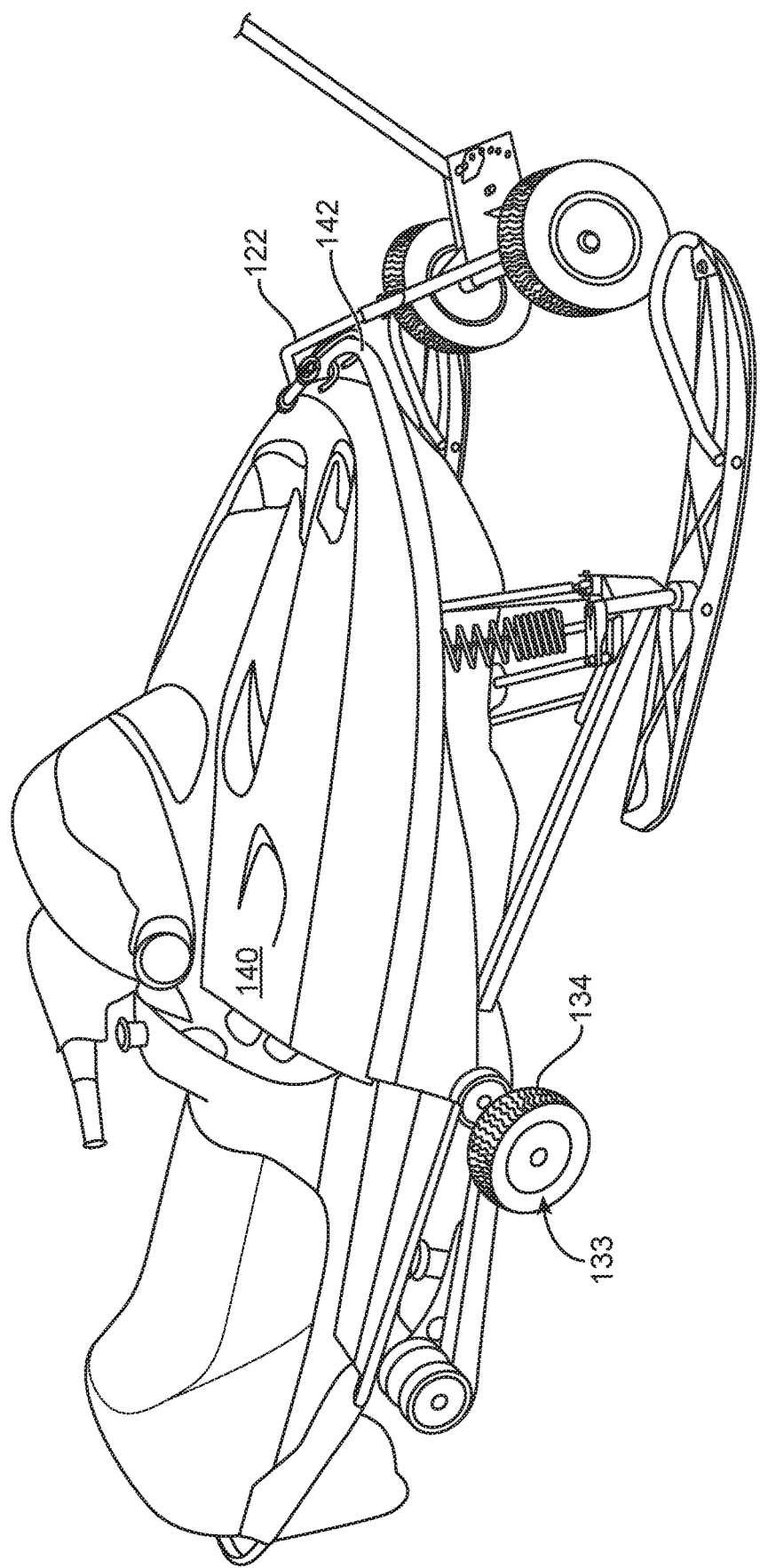
FIG. 14 is a partial perspective view of the carriage and hook attachment shown in FIGS. 12-13 hauling a snowmobile.
Figure 15:
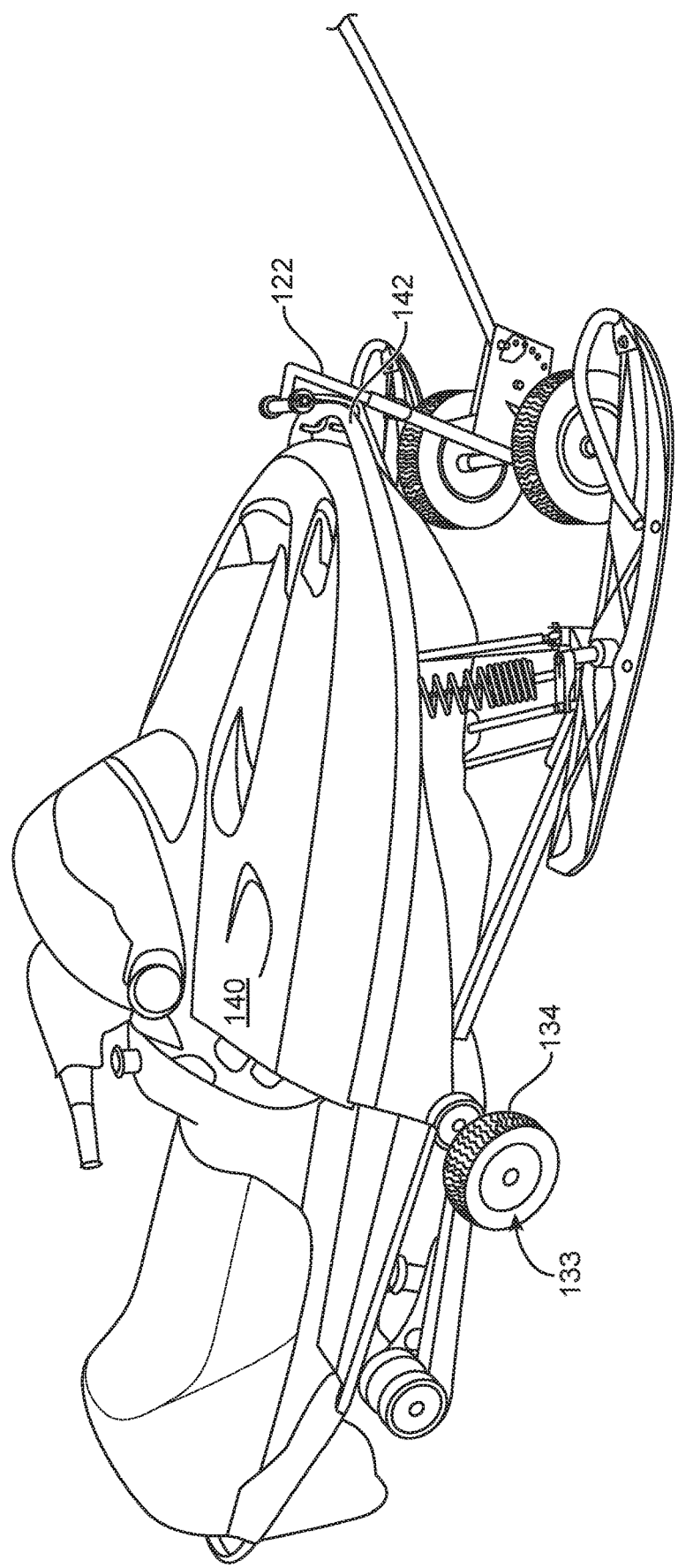
FIG. 15 is another plan view of the carriage and attachment shown in FIGS. 12-14 hauling a snowmobile.

The attachment shown in FIGS. 12-15 is adapted for cooperative use with an extra wheel assembly 133 comprising a set of wheels 134, 136 rotatably connected to the distal ends of an axle 138, as shown in FIGS. 13-15.

In operation, the carriage with the hoist is maneuvered to the rear of a snowmobile 140, which is typically provided with at least one rear grappling handle (not shown) and one front grappling handle 142. The carriage and hoist 120 are then further maneuvered to place at least one hook 126,128 beneath the rear grappling handle and then are raised upwardly into the rear grappling handle, whereby the rear end of the snowmobile 140 is lifted off and above its supporting surface. Then the extra wheel assembly is positioned below the snowmobile track, slightly away from the rear of the snowmobile, such that the wheels 134,136 extend on either side of the track. The carriage is maneuvered such that the hooks 126,128 are lowered, thereby lowering the rear end of the snowmobile onto the axle of the extra wheel assembly 133. The carriage is further maneuvered to lower the hooks 126,128 so that the hooks 126,128 lower beneath the rear grappling handle, and whereby the snowmobile track rests on the extra wheel assembly axle 138. Then the carriage is maneuvered to the front of the snowmobile 140 as shown in FIGS. 14 and 15. The carriage is maneuvered to place at least one hook 126,128 beneath the front grappling handle 142. The carriage and hoist 120 are then maneuvered to place at least one hook 126,128 beneath the front grappling handle 142 and then are raised upwardly into the front grappling handle, whereby the front end of the snowmobile is lifted off and above its supporting surface. Then, by pulling on the handle of the carriage, the snowmobile, now riding on the axle 138, may be transported to another desirable location. It will be appreciated that when the carriage is turned left or right, the condition of the "L"-shaped protrusion of the cross bar 24 being freely rotatable within and with respect to the vertical tube 122 permits the angle of the carriage relative to the snowmobile to vary. A reverse process is used to deposit the snowmobile at the desired location.

Figure 16:
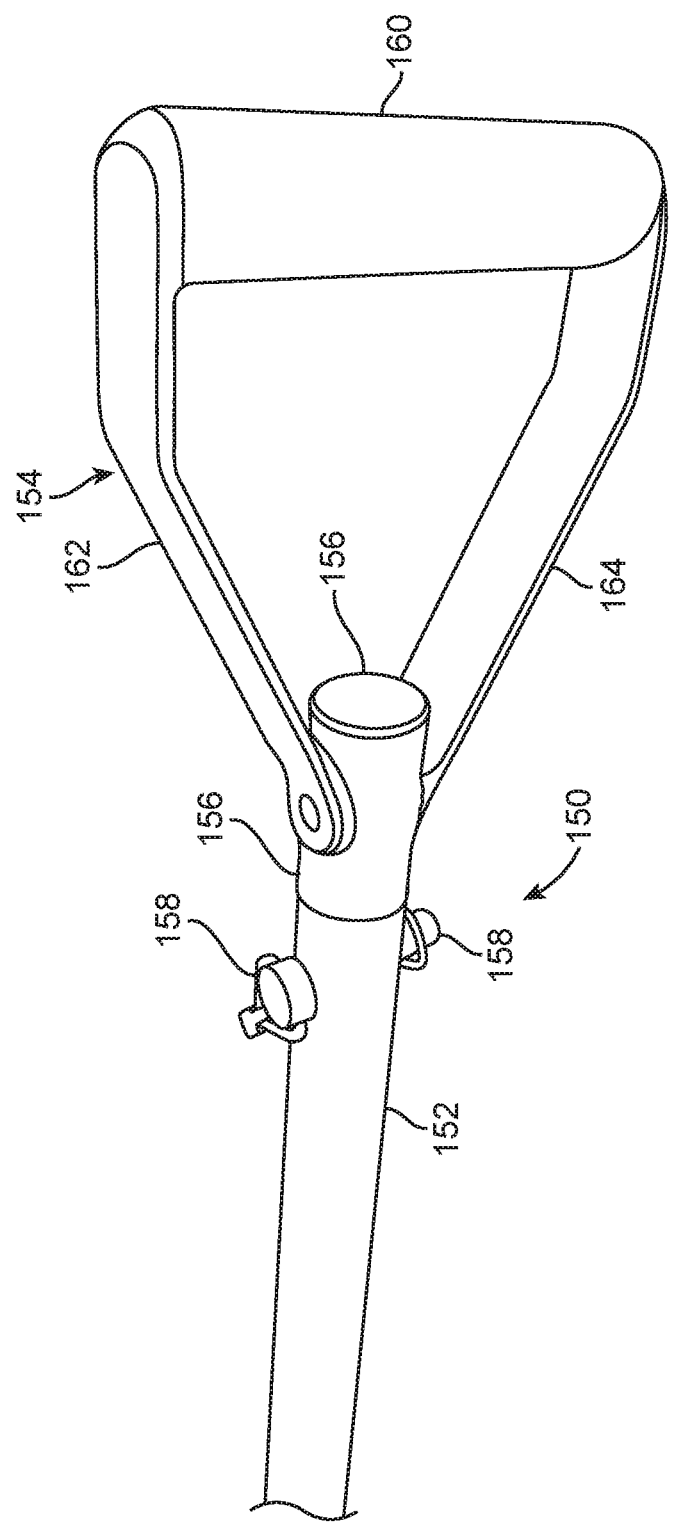
FIG. 16 is a front plan view of a grasping portion of a handle adapted to maneuver the carriage shown in FIGS. 1-3.

FIG. 16 depicts a different style of handle 150 than the T-shaped handle 16. The handle 150 includes a long tubular section 152 adapted to be selectively inserted into the receiver 20 or optionally also the receiver 40. The handle 150 includes a grip 154 including a cylindrical member 156 adapted to extend into the hollow, upper, distal end of the tubular section 152, which is provided with at least one and preferably two aligned holes extending laterally therethrough. The cylindrical member 156 possesses at least one, and preferably two aligned holes extending laterally therethrough at different longitudinal and radial positions. By aligning selected holes in the tubular section 152 and the cylindrical member 156 and further selectively inserting a bolt or pin 158 therethrough the grip 154 may be selectively connected to the tubular section 152 at different lengths and radial orientations relative to the tubular section 152. The grip 154 is generally fashioned as a stirrup, with a generally cylindrical portion 160 extending perpendicular to the cylindrical member 156 and a pair of brackets 162,164, each connected to (such as by bolts or welding) and extending from an associated end of the cylindrical portion 160 and connected to (such as by bolts or welding) an opposing lateral side of the cylindrical member 156. It will be appreciated that a person may grasp the grip 154 via the cylindrical portion 160 and push, pull, or otherwise maneuver the carriage.

Figure 12:
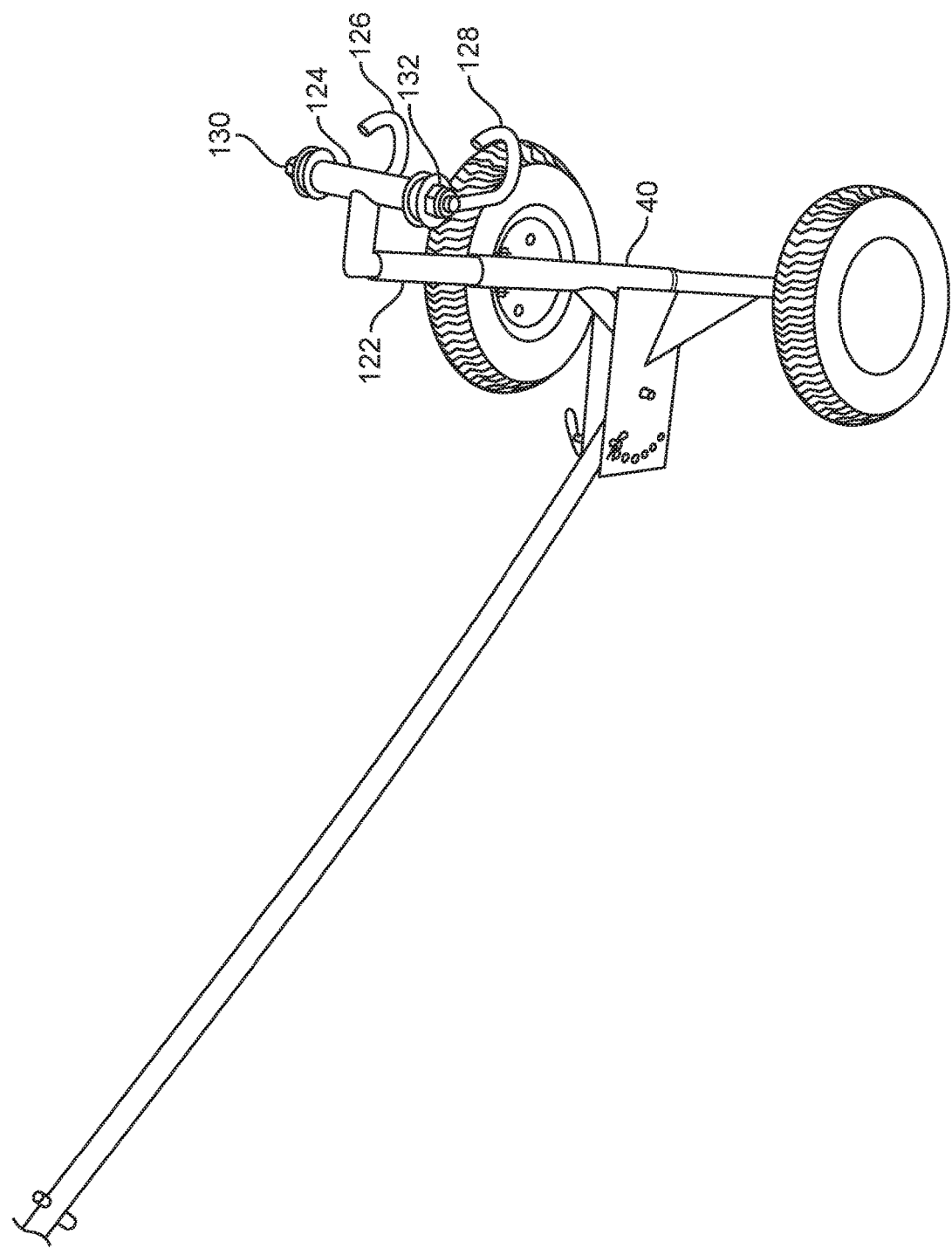
FIG. 12 is a plan view of the carriage shown in FIGS. 1-3 with a hook attachment for moving items such as a snowmobile.
Figure 17:
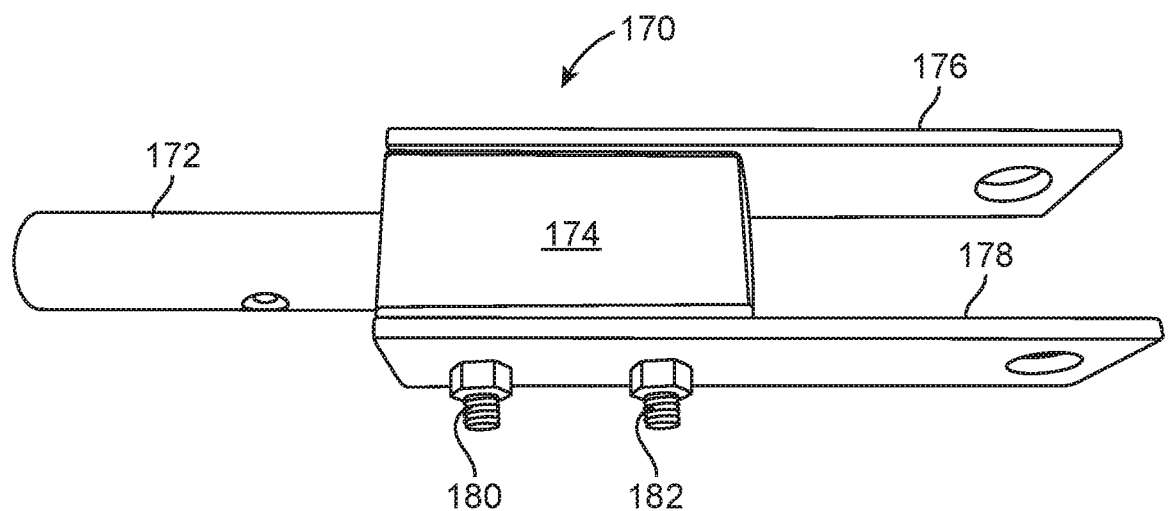
FIG. 17 is a perspective view of a clevis that may be used with the carriage shown in FIGS. 1-3 and attached to a towing hitch or tongue at the rear of a vehicle such as an ATV.
Figure 18:
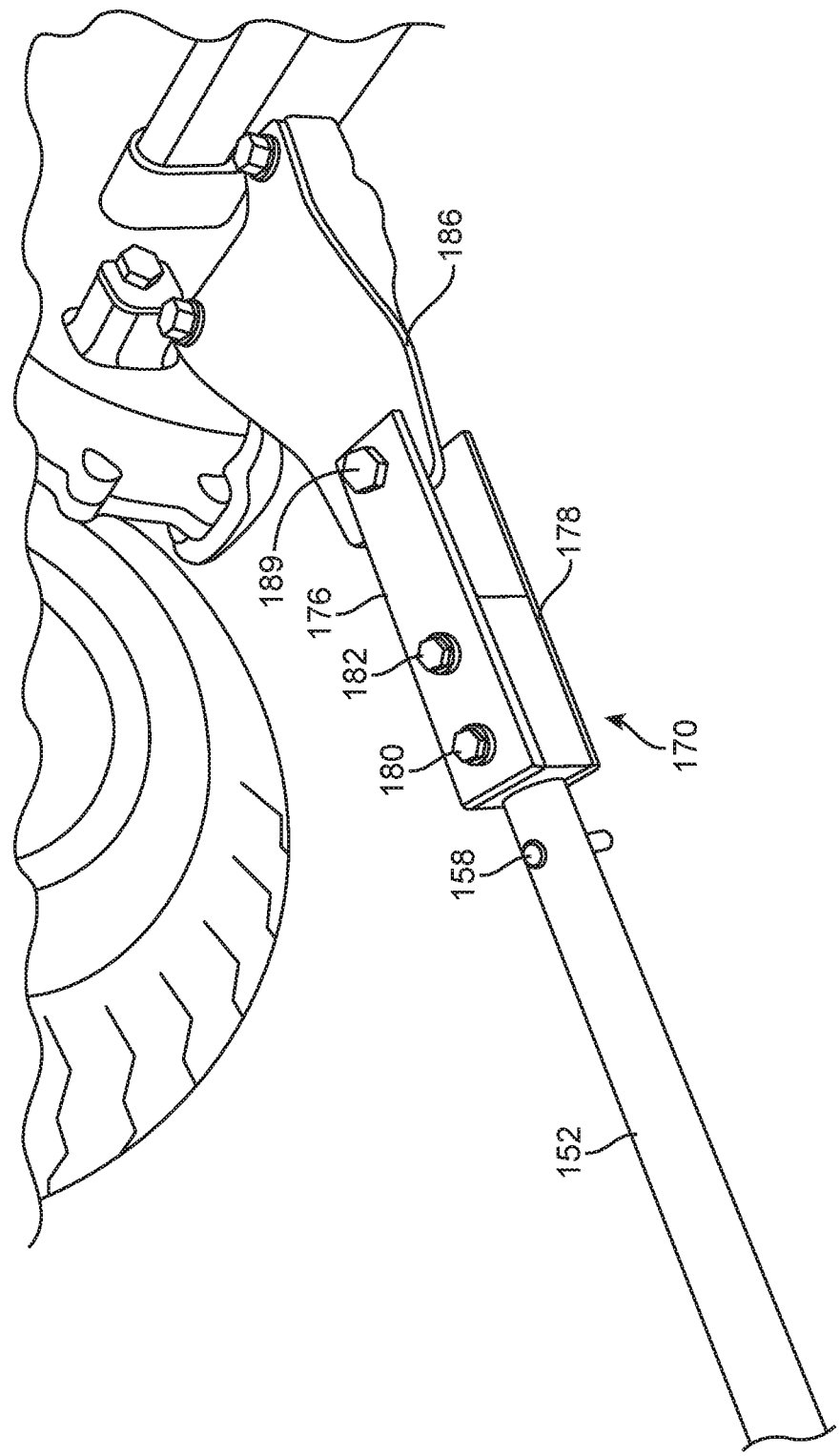
FIG. 18 is another perspective view of the clevis shown in FIG. 17 attached to the tongue or hitch of an ATV.
Figure 19:
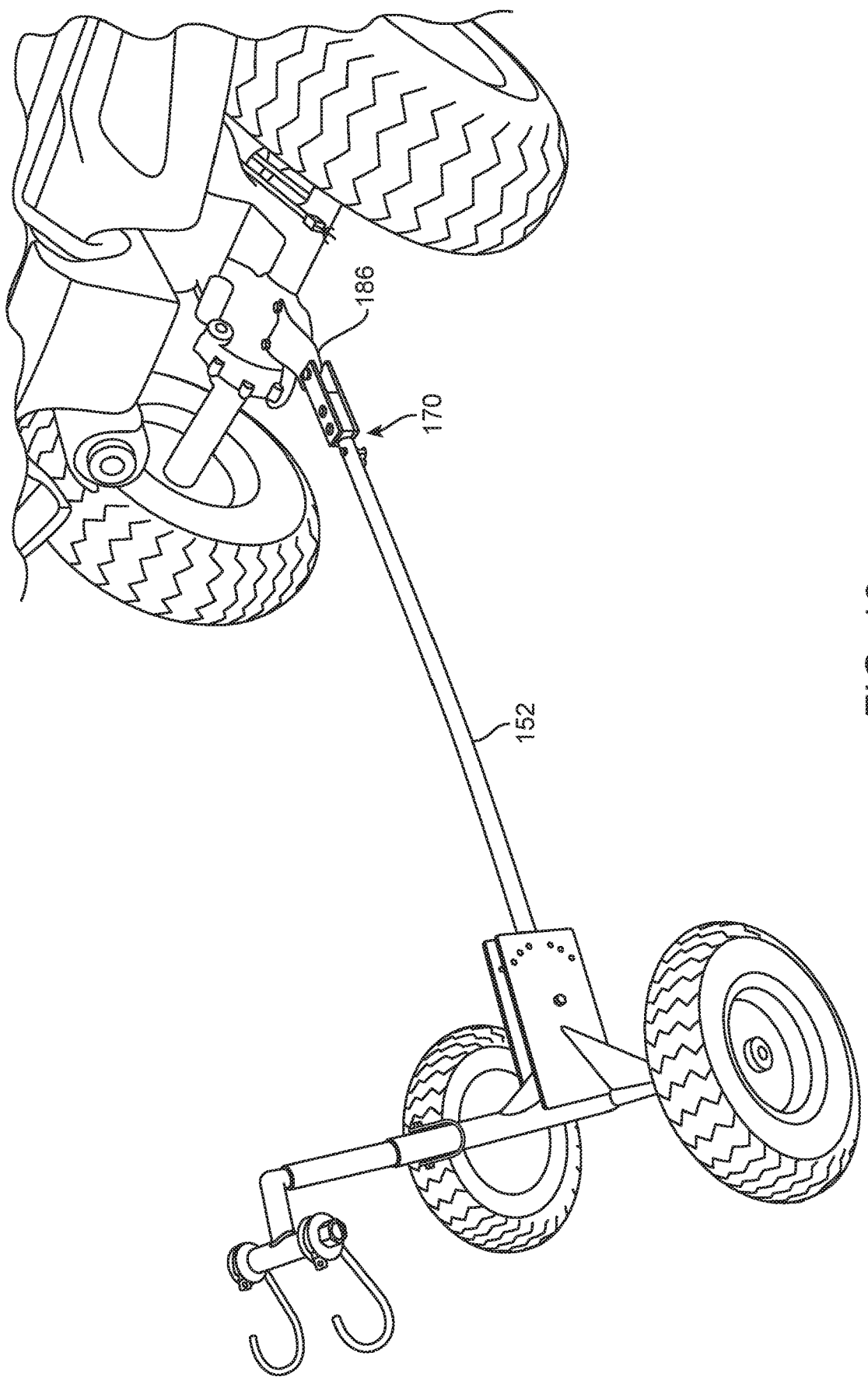
FIG. 19 is another perspective view of the carriage shown in FIGS. 1-3 with a hook attachment shown in FIGS. 12-15 attached to the tongue or hitch of an ATV.
Figure 20:
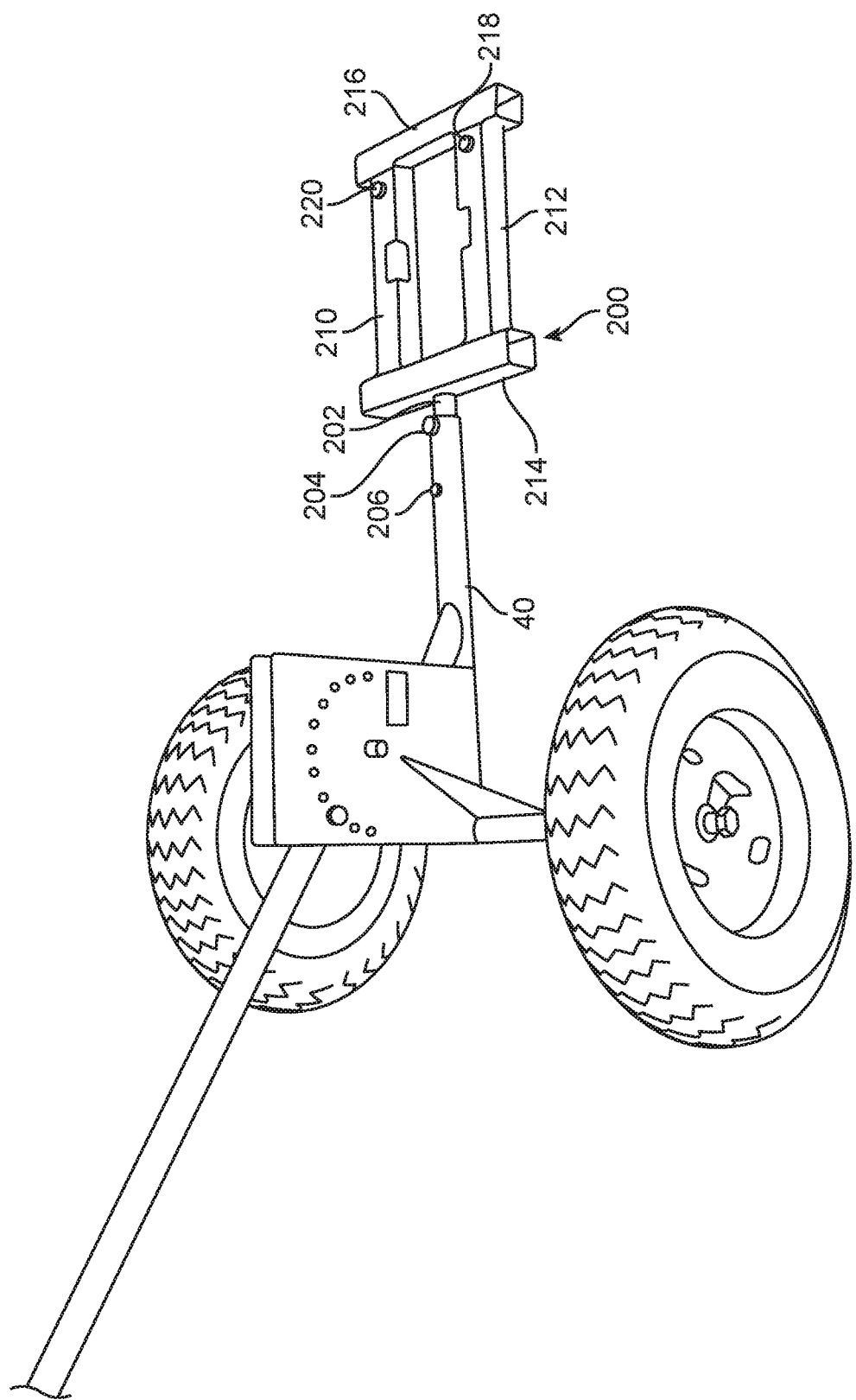
FIG. 20 is a perspective view of the carriage shown in FIGS. 1-3 with an attachment for surrounding and moving an aircraft wheel.
Figure 21:
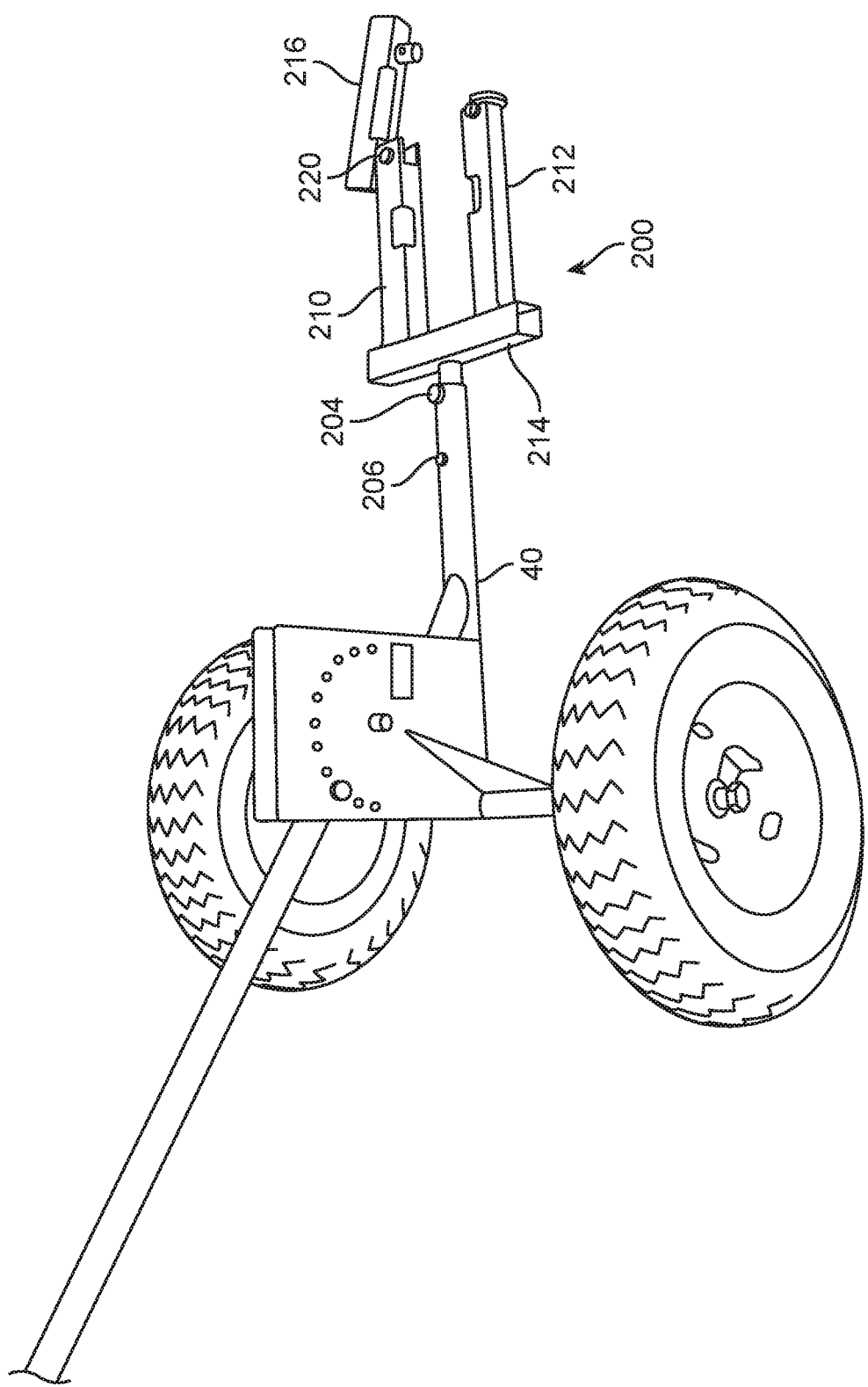
FIG. 21 is a another perspective view of the carriage and attachment shown in FIG. 20 with the attachment depicted in an open position for receiving the aircraft wheel.
Figure 22:
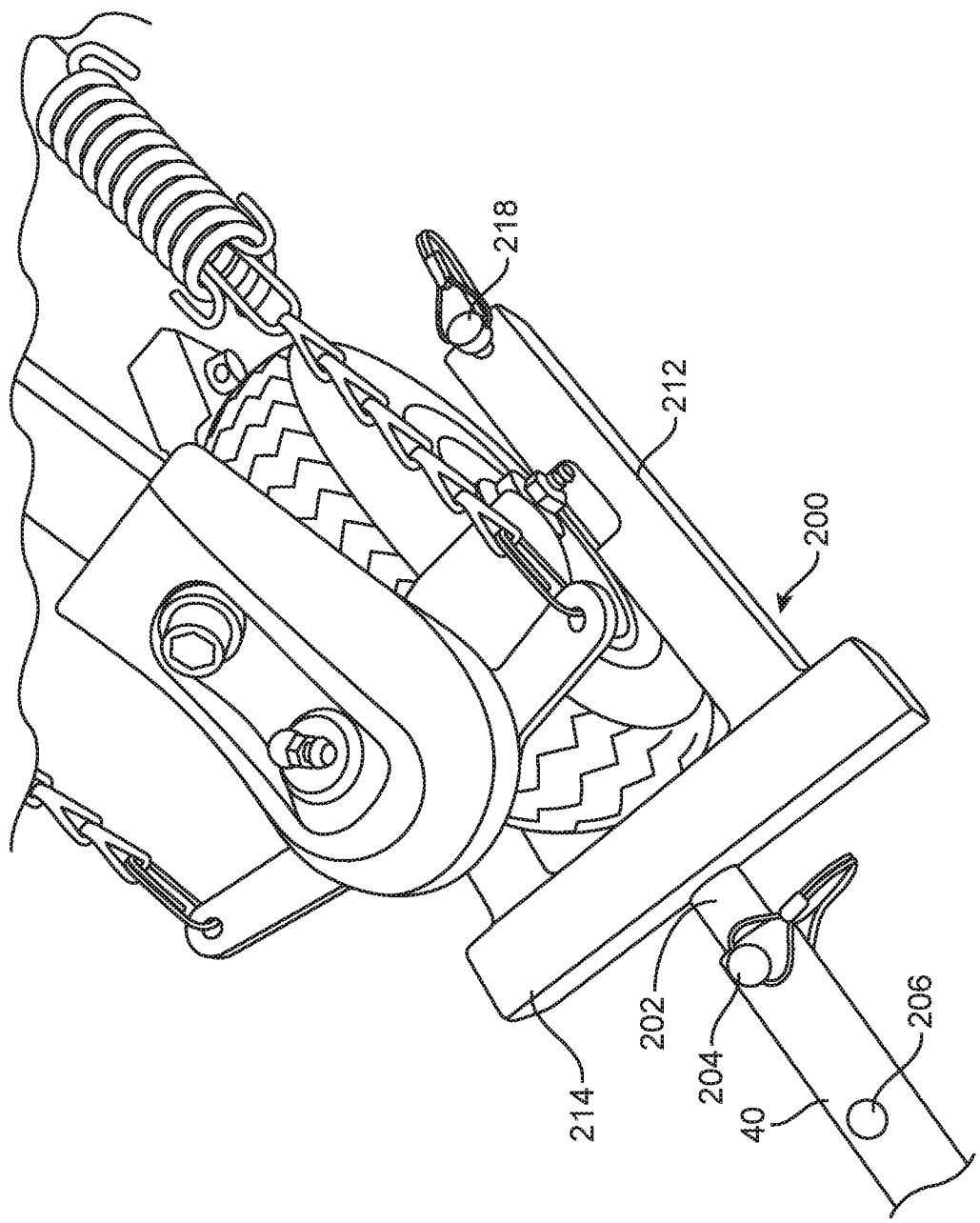
FIG. 22 is a perspective view of the attachment shown in FIGS. 20 and 21 with the attachment encompassing an aircraft wheel.
Figure 23:
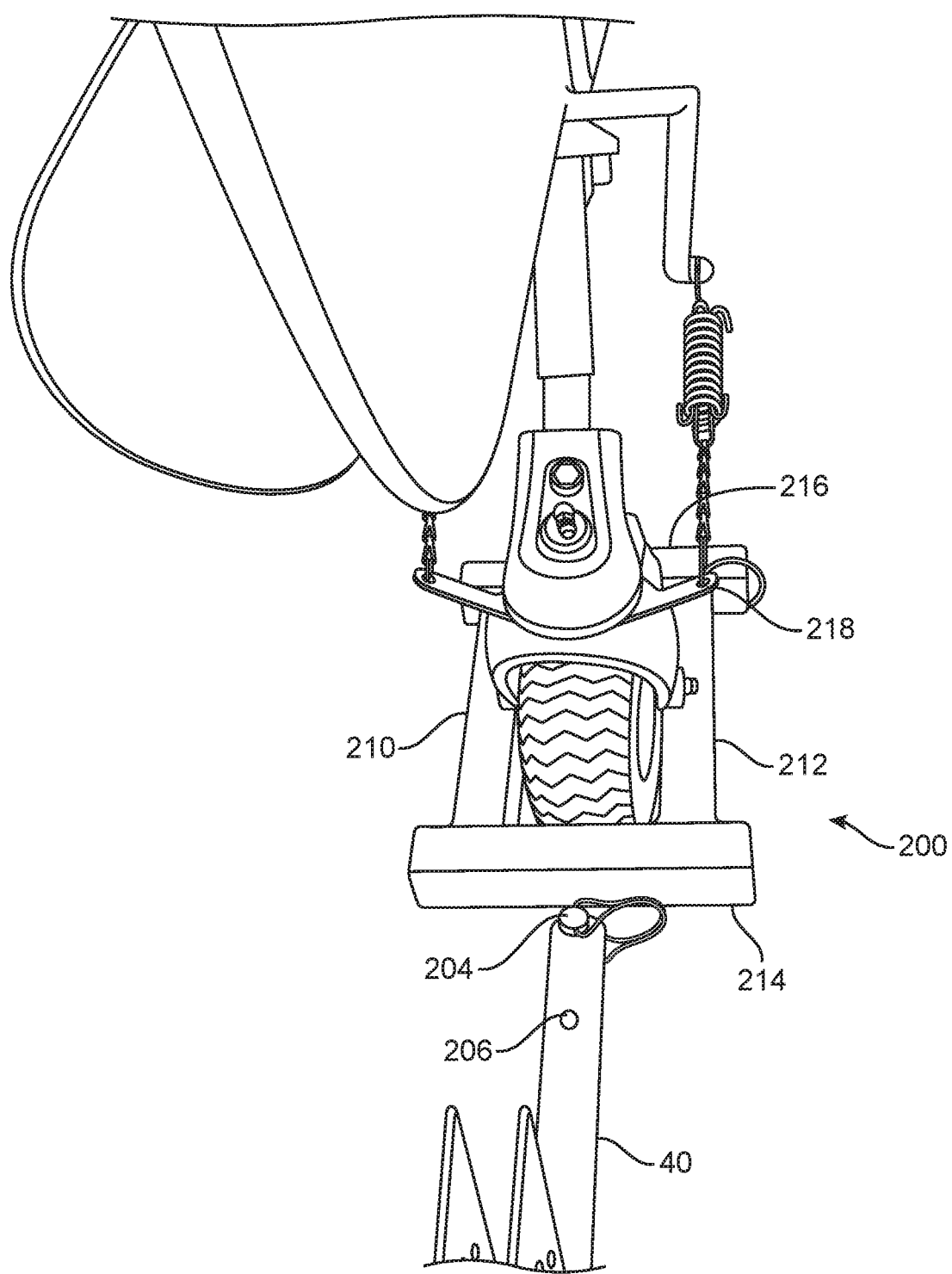
FIG. 23 is a different perspective view of the attachment shown in FIGS. 20-22 encompassing the aircraft wheel.

The handle 150 shown in FIG. 16 may be removed from the tubular section 152, and as shown in FIGS. 17-19, a clevis 170 may be selectively inserted into and selectively connected to the tubular section 152. The clevis 170 includes a cylindrical member 172 that may be similar to the cylindrical member 156 of the handles 150. One end of the cylindrical member 172 is attached such as by welding to a block 174 through which a pair of aligned holes laterally extend. The clevis 170 includes a pair of opposing, spaced, parallel horizontal bars 176,178. One end of each bar 176,178 is provided with a pair of aligned holes spaced such that the holes in each bar 176,178 may align with associated holes in the block 174 and such that bolts or pins 180,182 may selectively extend through the aligned holes of the block 174 and the bars 176,178 to secure the bars 176, 178 to the block 174. The other ends of each of the bars 176, 178 are provided with one or more holes adapted to receive a bolt or pin 184 that also, concurrently extends through a hole in a towing hitch or tongue 186 at the rear of a vehicle such as an ATV. As shown in FIG. 19, an ATV may thereby tow the carriage with a working attachment as shown in FIGS. 12-14. Thus, for example, the ATV may be used to tow a snowmobile.

There is shown in FIGS. 20-23 the carriage utilized with another working attachment, in this instance, a wheel clasp 200 that may be especially adapted for capturing and carrying an airplane wheel and thereby maneuvering an airplane. The clasp 200 includes a cylindrical or bar member 202 adapted to be selectively inserted into the receiver 40 of the carriage. The bar member 202 possesses holes as have been previously described with respect to other aspects of the invention above, and are designed to align selectively with holes in the receiver 40 as previously described and to be selectively attached to the receiver 40 by means of bolts or pins 204, 206. The clasp 200 also includes a square shaped cage 208 possessing a pair of opposing lateral sides 210, 212 and a pair of longitudinal sides 214, 216 forming a central pocket sized and configured to receive the wheel of a vehicle, such as the rear wheel of an airplane. The cage 208 is connected to an end of the bar member 202 such as by welding the end of the bar member 202 to the longitudinal side 214 of the cage 208, midway along the longitudinal side 214. The longitudinal side 216 is hinged at one thereof to the lateral side 210. The other end of the longitudinal side 216 is provided with a hole adapted to align with a hole in the end of the other lateral side 212, and a bolt or pin 218 may selectively extend through the aligned holes. The inner surfaces of the lateral sides 210, 212 may be recessed so as to receive the ends of the wheel axle and to thereby inhibit movement of the wheel when captured in the cage 208. In operation, the carriage is maneuvered so that the longitudinal side 216 is positioned near the wheel. The bolt or pin 218 is removed from a position of insertion in the aligned holes, and the longitudinal side 216 is swung open about the hinge 220. The carriage is then further maneuvered to move the cage 208 such that the later sides 210, 212 are on either side of the wheel and the longitudinal side 214 abuts or is near the wheel. The longitudinal end 216 is then swung about the hinge 220 so that the holes in the ends of the longitudinal side 216 and the lateral side 212 align and then the bolt or pin 218 is inserted through the aligned holes. The carriage is maneuvered so as to raise up the clasp 200, which in turn raises the wheel and the airplane, and then the airplane may be pulled, pushed, or otherwise maneuvered to a different position on a supporting surface. Once the airplane is in the desired position, a reverse process is used to release the wheel from the cage 208.

Each of the lateral sides 210, 212 may be provided with telescoping extensions (not shown). The distal end of one extension may include the hinge 220, and the distal end of the other extension may include a hole through which the bolt or pin 218 may be selectively received. The lateral sides 210, 212 and the extensions may be provided with alignable holes laterally therethrough by which a bolt or pin may selectively extend in order to selectively adjust and maintain the length of extension of each telescoping extension and thereby change the effective length of each lateral side 210, 212 and thereby change the effective length of the cage 208. In this manner, the clasp 200 may accommodate different sizes or numbers of airplane wheels.

Figure 24:
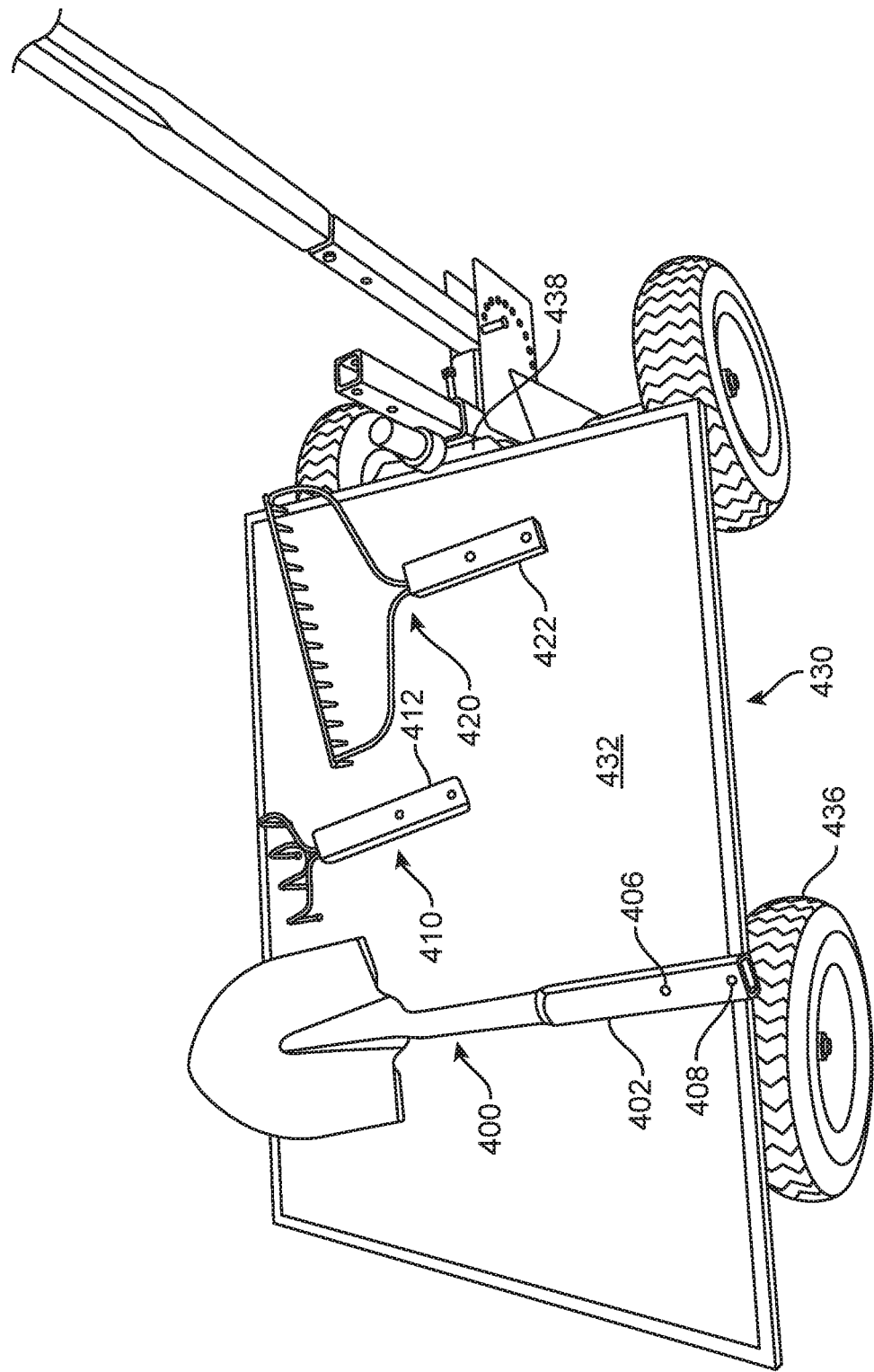
FIG. 24 is a perspective view of the carriage shown in FIGS. 1-3 with a wagon attachment on which is carried a shovel, a claw, and a rake that also may be interchangeably attached to the carriage.

As shown in FIG. 24, the carriage may be used with a variety of garden and earth working tools. One of the tools may be a spade shovel 400 in which the shaft 402 of the shovel is relatively short and is configured to be slidably received into the first receiver 40. The short shaft 402 is provided with a pair of spaced, laterally extending holes 406, 408 therethrough that are adapted to align with the holes in the outward end of the receiver 40 and to be selectively secured thereto by means of bolts or pins extending through the aligned holes. Another tool may be a garden claw 410 also provided with a relatively short shaft 412 similar to the short shaft 402 of the shovel 400 and adapted for insertion into and to be selectively secured to the first receiver 40. Yet another tool may be a garden rake 420 likewise provided with a relatively short shaft 422 similar to the short shaft 402 of the shovel 400 and likewise adapted for selective insertion into and to be selectively secured to the first receiver 40.

FIG. 24 also depicts an wagon 430 including a platform 432 mounted on and above a pair of spaced rotatable wheels (only one wheel 436 of which is shown) and a tongue 438 pivotably mounted on one end to the platform 432. The tongue 438 may be fashioned like the short shaft 402 of the shovel 400 and adapted for selective insertion into and to be selectively secured to the first receiver 40.

Figure 25:
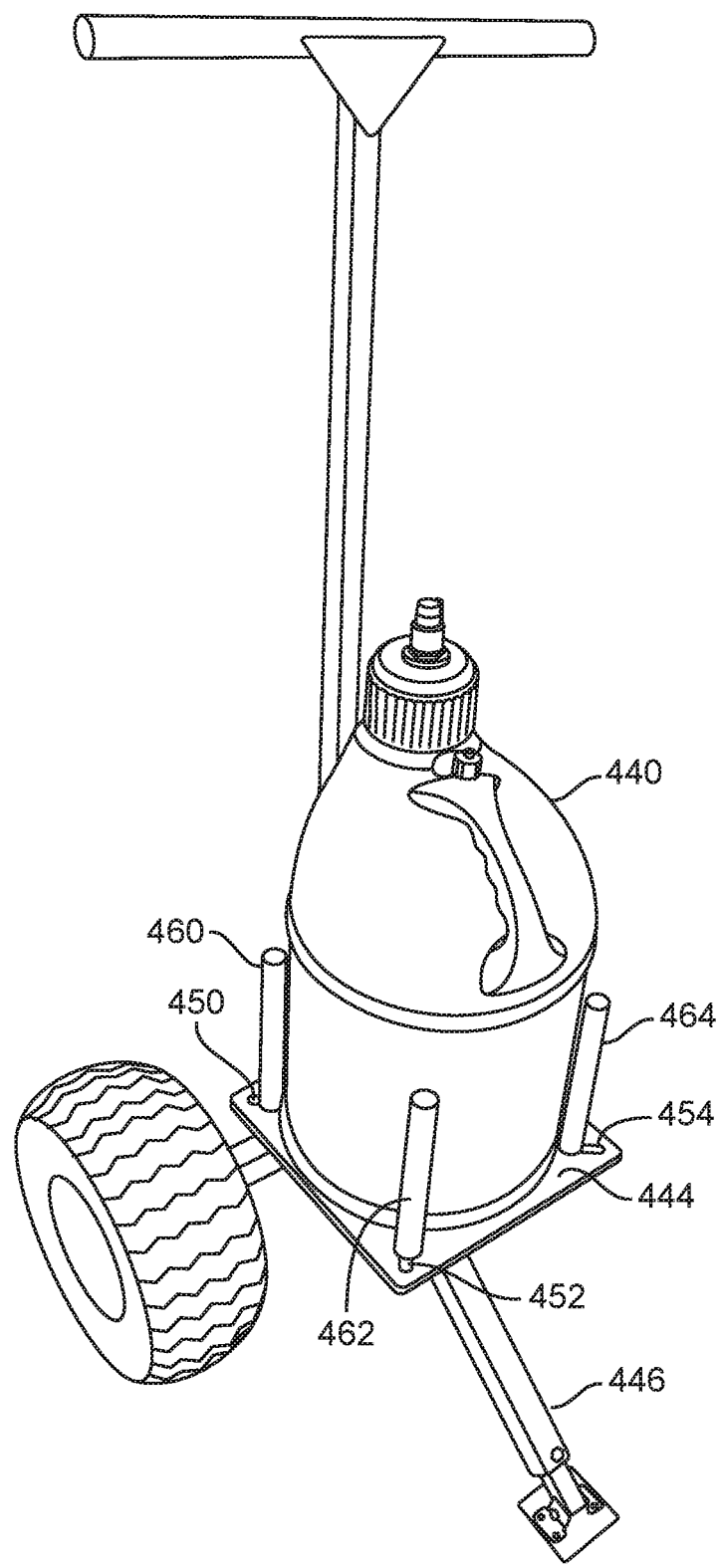
FIG. 25 is a perspective view of the carriage shown in FIGS. 1-3 with an attachment for transporting containers of various sizes showing a container being transported.
Figure 26:
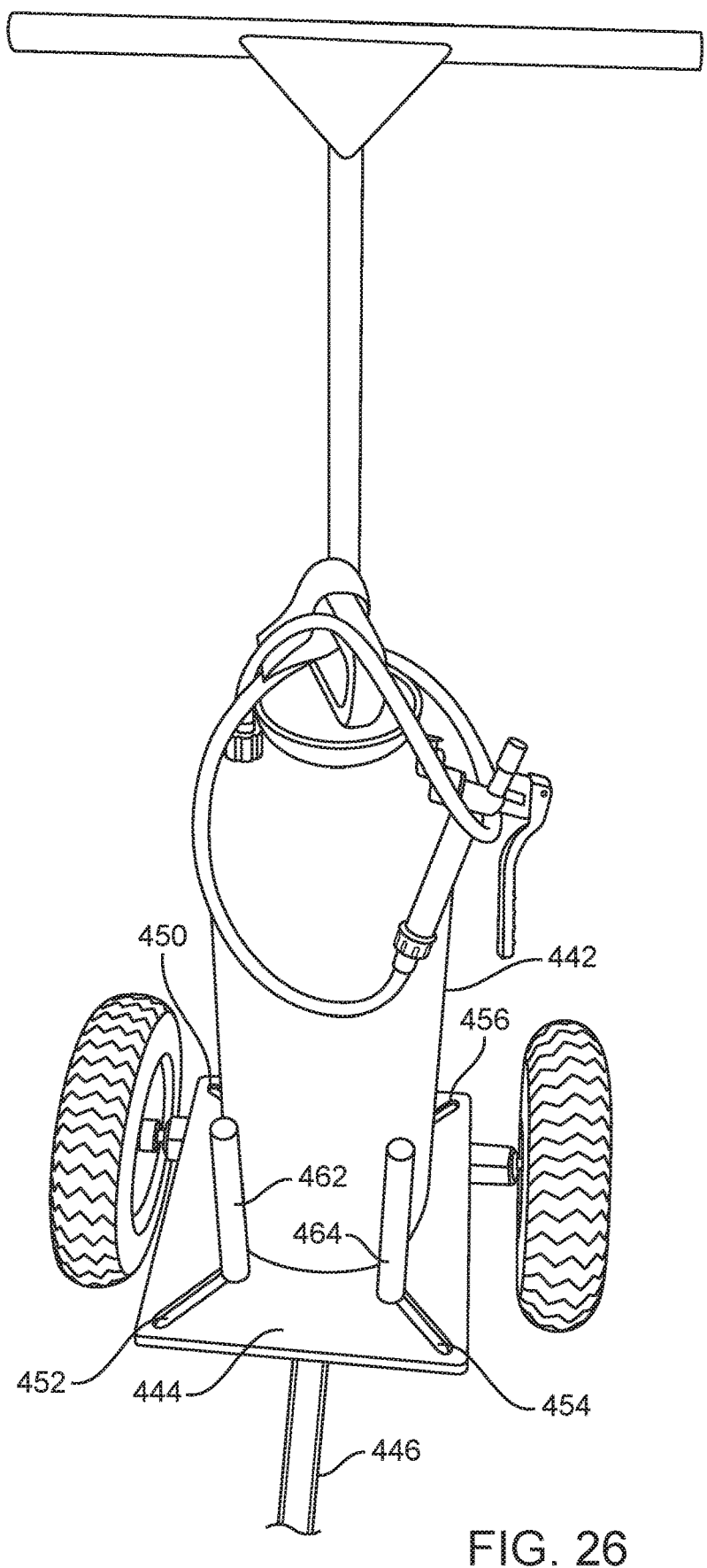
FIG. 26 is a perspective view the carriage shown in FIGS. 1-3 and 25 with the attachment shown with a different size container being transported.

As shown in FIGS. 25 and 26, the carriage may be used for hauling different sized bottles 440, 442 of fluids or barrels of fluids or particulate materials. In this embodiment, a bottle 440, 442 is adapted to be selectively mounted on the top of a flat support plate 444. A short shaft (not shown) similar to the short shaft 402 of the shovel 400 and adapted for selective insertion between and to be selectively secured to the plates 23, 25 is fixed to and is preferably welded to the bottom of the support plate 444. Also a footer 446 extends beneath and is fixed to and is preferably welded to the bottom of the support plate 444. The footer 446 is configured so as to maintain the support plate 444 in a substantially horizontal position when the distal end of the footer 446 rests on the ground or other surface.

The support plate 444 includes a plurality of linear slots 450, 452, 454, 456 therethrough and arranged in a radially extending manner. An associated pipe or rod 460, 462, 464, 466 is adapted to extend upright from each associated slot 450, 452, 454, 456. A bolt (not shown) is adapted to threadably extend into the lower interior end of each rod 460, 462, 464, 466 such that when the bolt is tightened, the associated rod is secured in a selected position along the associated slot, and when the bolt is loosened, the associated rod may be moved to a different position along the associated slot or may removed from connection to the support plate 444.

Figure 27:
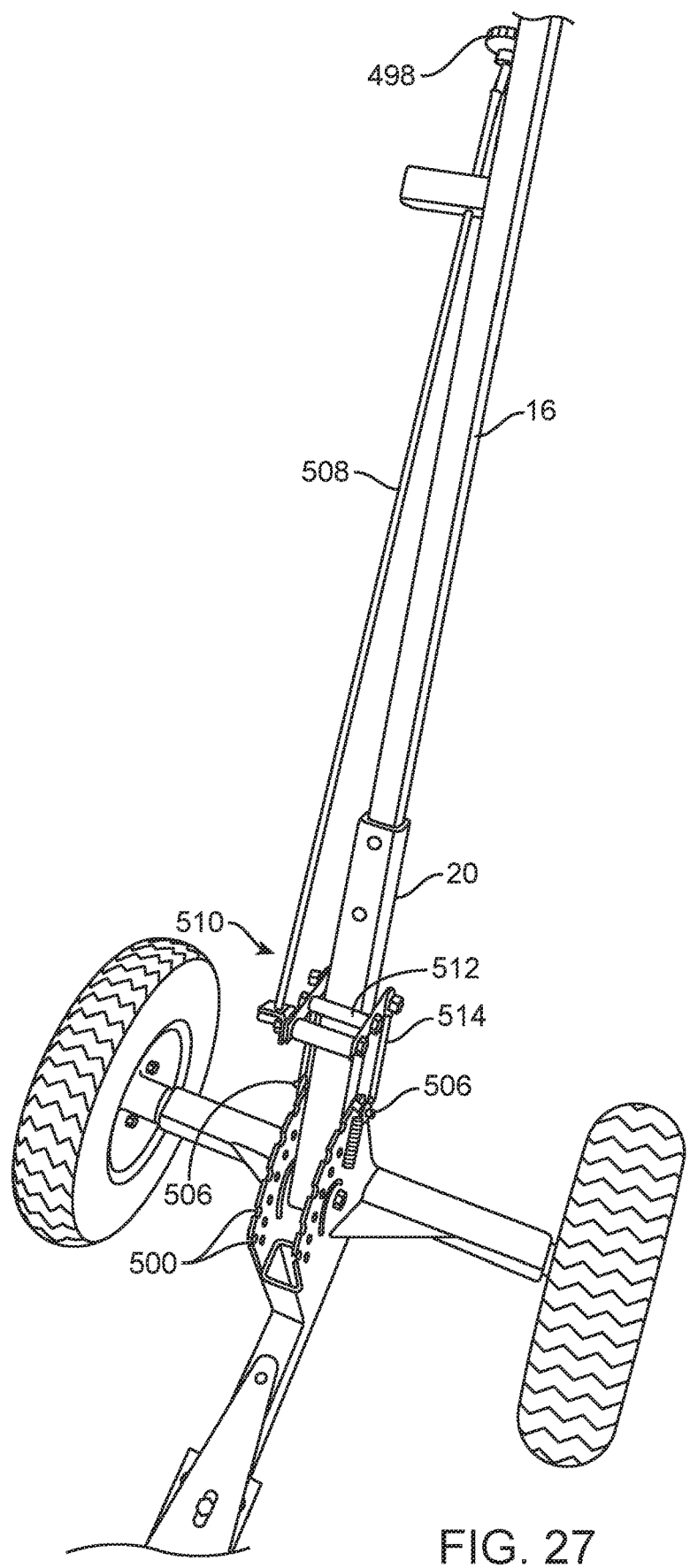
FIG. 27 is a partial perspective view of a carriage in accordance with another embodiment of the present invention.
Figure 28:
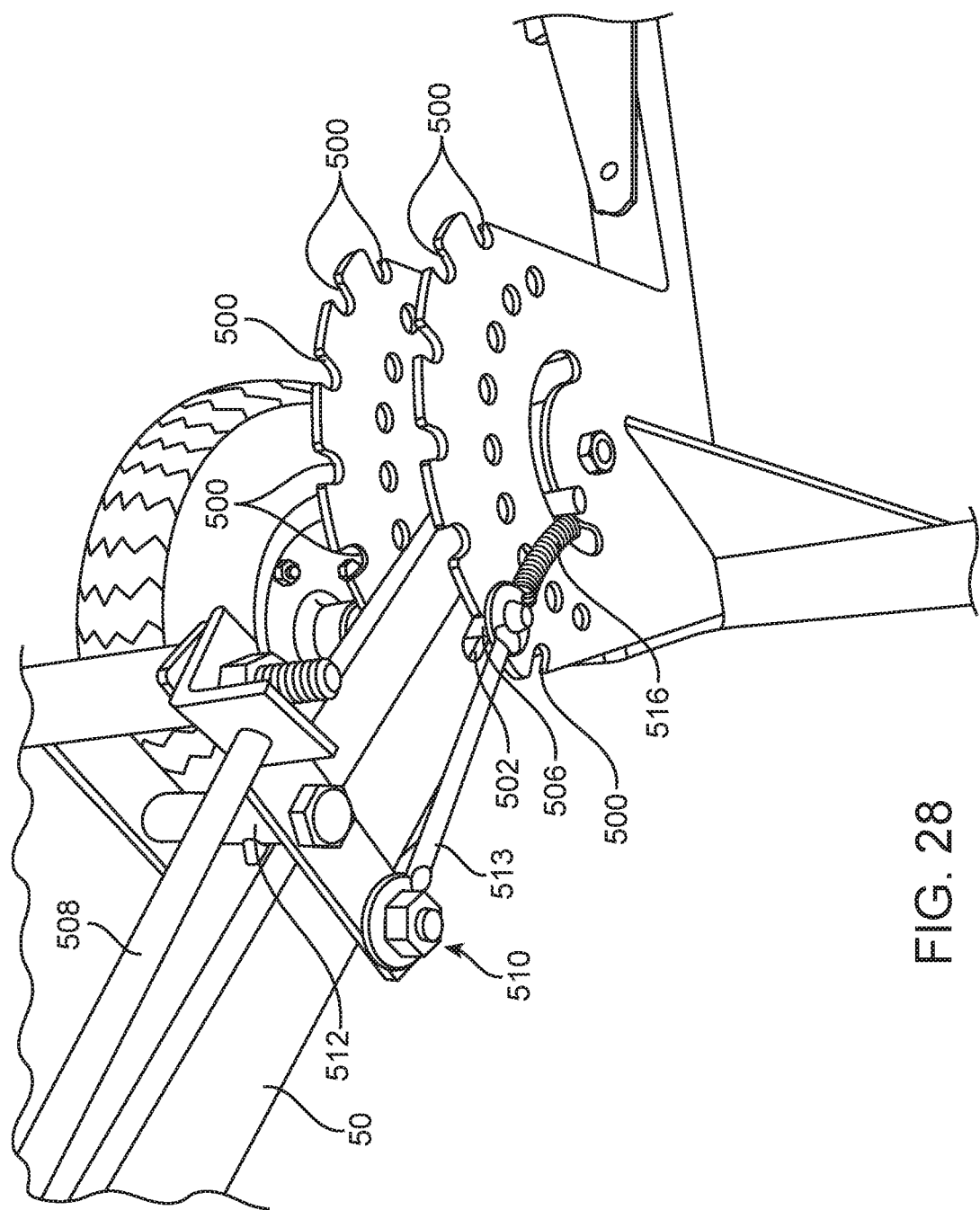
FIG. 28 is a partial perspective view of a portion of the carriage shown in FIG. 27.

Yet another embodiment of the carriage is shown in FIGS. 27-29 in this embodiment, the handle 16 selectively secured to the second receiver 20 and the second receiver 20 may be rotatably adjusted relative to the frame 10 by manual manipulation (preferably pulling or pushing) of a knob 498 near the hand grasp of the handle 16. In this embodiment, the rectangular plates 23, 25 may be provided with an arcuate upper peripheral surface in which a series of recesses 500 are equiangularly spaced about the arcuate periphery. A linear slot 502, 504 extends along each lateral side of the second receiver 20, and a bolt or pin 506 selectively extends through both slots 502, 504 such that each longitundinal end of the blot or pin 506 extend outwardly form the second receiver 20 and may be selectively positioned in the recesses 500 about the arcuate periphery of each plate 23, 25.

The knob 498 is mounted on the upper distal end of a rod 508 extending along the side of the second receiver 20. The other distal end of the rod 508 is attached to one side of a hinge 510 that pivots about a pivot pin 512. A short rod 512, 514 is rotatably attached to the other side of the hinge 510 at one distal end thereof and is rotatably attached at the other distal end thereof to an associated end of the bolt or pin 506 extending through the slots 502 in the second receiver 20. A compression spring 516 is connected at one thereof the bolt or pin 506 and at the other end thereof to the frame 10, a plate 23, 25, or to another component of the carriage. The compression spring 516 functions to bias the bolt or pin 506 toward the lower portion of the slots 502, 504 and also toward the arcuate periphery of each plate 23, 25 and into the recesses 500.

In operation, the a person may grasp the knob 498 and pull on the knob 498 so as to pivot the hinge 510 whereby the bolt or pin 506 acts moves upwardly in the slots 502, 504, against the bias of spring 516, and radially away from a position of disposition with recesses 500. The handle 16 may then be freely rotated with respect to the plates 23, 25 to another selected radial position, whereupon the knob 498 is released or pushed downward, which in turn cause the hinge 510 to act under the bias of the spring 516, move downwardly in the slots 502, 504 and forcefully into any others of the recesses 500. Thus, this embodiment allows a person to change the angle of the handle 16 relative to the frame without bending down and without needing to remove, reposition, and reconnect the bolt or pin 506.

FIG. 29 also shows yet another implement—a scoop or a dust pan 600—that may be connected to the carriage. A tongue 602 is attached to the rear of the pan 600 and is provided with a pair of spaced holes configured to align with the holes extending through the first receiver 40. A bolt may selective extend through the aligned holes in the tongue 602 and the first receiver 40.

It should be understood that the invention has been described with one part telescopingly mating with another part in a male-female relationship and that the parts may be reversed in their male-female modalities.

While various embodiments of the present invention have been described herein, it will be appreciated that the invention includes embodiments other than those specifically illustrated or described and that changes in the form and arrangement of parts and the specific manner of practicing the invention may be varied without departing from the nature or scope of the invention. Consequently, the invention may be practiced otherwise than is specifically described above.

While exemplary embodiments have been presented in the foregoing description of the invention, it should be appreciated that a vast number of variations within the scope of the invention may exist. The foregoing examples are not intended to limit the nature or the scope of the invention in any way. Rather, the foregoing detailed description provides those skilled in the art with a foundation for implementing other exemplary embodiments of the invention.

I claim:

1. A manually maneuverable carriage comprising:
    a frame mounted on a plurality of rotatable wheels;
    a first receiver configured for receiving either a handle or a working attachment;
    a second receiver configured for receiving either the handle or the working attachment;
    means for selectively positioning and maintaining the first receiver at a selected rotational position relative to the frame, said means including a pin mounted on the first receiver, including a plate possessing a plurality of pin receiving spaces into one of which the pin is adapted to selectively extend, including a manually pivotable hinge to which the pin is connected, the hinge adapted to be pivotable into a first position where the pin extends into a receiving space and a second position where the pin does not extend into a receiving space, wherein the hinge is biased toward the first position and not the second position, and wherein the pin is captured within at least one slot within the first receiver and is adapted to slidably, reciprocally travel within the at least one slot.

2. The manually moveable carriage according to claim 1 wherein the working attachment comprises logging clamps.

3. A manually moveable carriage comprising:
    a frame mounted on a plurality of wheels;
    a first receiver configured for receiving a handle;
    a second receiver configured for receiving a working implement;

means for selectively positioning and maintaining the first receiver at a selected rotational position relative to the frame, which means includes (a) a pin mounted on the first receiver, (b) a plate possessing a plurality of pin receiving spaces into one of which the pin is adapted to selectively extend, the pin receiving spaces disposed on and forming a part of the periphery of the plate and substantially equidistantly arranged in an arcuate configuration, (c) means for biasing the pin toward the pin receiving spaces, and (d) a manually pivotable hinge to which the pin is connected, the hinge adapted to be pivotable into a first position where the pin extends into a receiving space and a second position where the pin does not extend into a receiving space, wherein the hinge is biased toward the first position and not the second position, and wherein the pin is captured within at least one slot within the first receiver and is adapted to slidably, reciprocally travel within the at least one slot.

4. The manually moveable carriage according to claim 3 wherein the working attachment comprises logging clamps.

5. A manually moveable carriage comprising:
a frame mounted on a plurality of rotatable wheels;
a first receiver configured for receiving either a handle or a working attachment;
a second receiver configured for receiving either the handle or the working attachment;
means for selectively positioning and maintaining the first receiver at a selected rotational position relative to the frame; and means for selectively positioning and maintaining the second receiver at a selected rotational position relative to the frame.

6. The manually moveable carriage according to claim 5 wherein the means for selectively positioning and maintaining the second receiver includes a pin mounted on the second receiver and includes a plate possessing a plurality of pin receiving spaces into one of which the pin is adapted to selectively extend.

7. The manually moveable carriage according to claim 6 wherein the means for selectively positioning and maintaining the second receiver includes a means for biasing the pin toward the pin receiving spaces.

8. The manually moveable carriage according to claim 6 and wherein the means for selectively positioning and maintaining the second receiver includes a manually pivotable hinge to which the pin is connected, the hinge adapted to be pivotable into a first position where the pin extends into a receiving space and a second position where the pin does not extend into a receiving space.

9. The manually moveable carriage according to claim 8 wherein the hinge is biased toward the first position and not the second position.

10. The manually moveable carriage according to claim 9 wherein the pin is captured within at least one slot within the second receiver and is adapted to slidably, reciprocally travel within the at least one slot.

11. The manually moveable carriage according to claim 5 wherein the working attachment comprises logging clamps.

* * * * *